(12) United States Patent
Tsuzuki

(10) Patent No.: US 9,944,222 B2
(45) Date of Patent: Apr. 17, 2018

(54) VEHICLE HEADLAMP LIGHT DISTRIBUTION CONTROL DEVICE AND METHOD, AND STORAGE MEDIUM

(71) Applicant: Toyota Jidosha Kabushiki Kaisha, Toyota-shi, Aichi-ken (JP)

(72) Inventor: Katsutoshi Tsuzuki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/426,684

(22) Filed: Feb. 7, 2017

(65) Prior Publication Data

US 2017/0225609 A1  Aug. 10, 2017

(30) Foreign Application Priority Data

Feb. 10, 2016 (JP) ................... 2016-023993

(51) Int. Cl.
*B60Q 1/14* (2006.01)
*B60Q 1/115* (2006.01)
*F21S 8/10* (2006.01)

(52) U.S. Cl.
CPC .............. *B60Q 1/115* (2013.01); *B60Q 1/143* (2013.01); *F21S 48/1742* (2013.01); *F21S 48/1747* (2013.01); *F21S 48/1757* (2013.01); *B60Q 2300/13* (2013.01); *B60Q 2300/41* (2013.01); *B60Q 2300/42* (2013.01)

(58) Field of Classification Search
CPC .... B60Q 1/085; B60Q 1/143; B60Q 2300/41; B60Q 2300/42; B60Q 2300/114
USPC .......................................................... 315/77
See application file for complete search history.

(56) References Cited

U.S. PATENT DOCUMENTS

| 6,229,263 | B1* | 5/2001 | Izawa | B60Q 1/115 315/80 |
|---|---|---|---|---|
| 2003/0107323 | A1* | 6/2003 | Stam | F21S 48/171 315/82 |
| 2009/0067184 | A1* | 3/2009 | Kamioka | B60Q 1/085 362/464 |
| 2009/0190323 | A1 | 7/2009 | Watanabe et al. | |
| 2010/0168957 | A1* | 7/2010 | Takahashi | G01S 7/497 701/29.2 |
| 2011/0031808 | A1 | 2/2011 | Hwang | |
| 2013/0257274 | A1 | 10/2013 | Sekiguchi | |

(Continued)

FOREIGN PATENT DOCUMENTS

| EP | 2281718 A1 | 2/2011 |
|---|---|---|
| JP | 2009-067084 A | 4/2009 |

(Continued)

*Primary Examiner* — Tung X Le
(74) *Attorney, Agent, or Firm* — Dinsmore & Shohl LLP

(57) ABSTRACT

A vehicle headlamp light distribution control device includes: a detector that is configured to detect a reference position from an image of a frond region of a vehicle; and a controller that is configured to control, during a time period until the reference position is detected by the detector, a light distribution of a headlamp of the vehicle in accordance with a sensed inclination of the vehicle or a physical amount expressing the inclination of the vehicle, and to control, after the reference position is detected by the detector, the light distribution of the headlamp on the basis of calibrated information obtained by calibrating information obtained from the image in accordance with the detected reference position.

6 Claims, 13 Drawing Sheets

(56) References Cited

U.S. PATENT DOCUMENTS

| | | | | |
|---|---|---|---|---|
| 2015/0088378 A1* | 3/2015 | Sugai | ............ | B60G 17/018 |
| | | | | 701/37 |
| 2016/0034770 A1* | 2/2016 | Peterson | ............ | G06K 9/00825 |
| | | | | 701/49 |
| 2017/0076160 A1* | 3/2017 | Ohara | ............ | G08G 1/16 |

FOREIGN PATENT DOCUMENTS

| | | | |
|---|---|---|---|
| JP | 2009-179121 A | 8/2009 |
| JP | 2010-143506 A | 7/2010 |
| JP | 2011-031808 A | 2/2011 |
| JP | 2013-203130 A | 10/2013 |

\* cited by examiner

LIGHT DISTRIBUTION PATTERN OF LEFT HEADLAMP UNIT

LIGHT DISTRIBUTION PATTERN OF RIGHT HEADLAMP UNIT

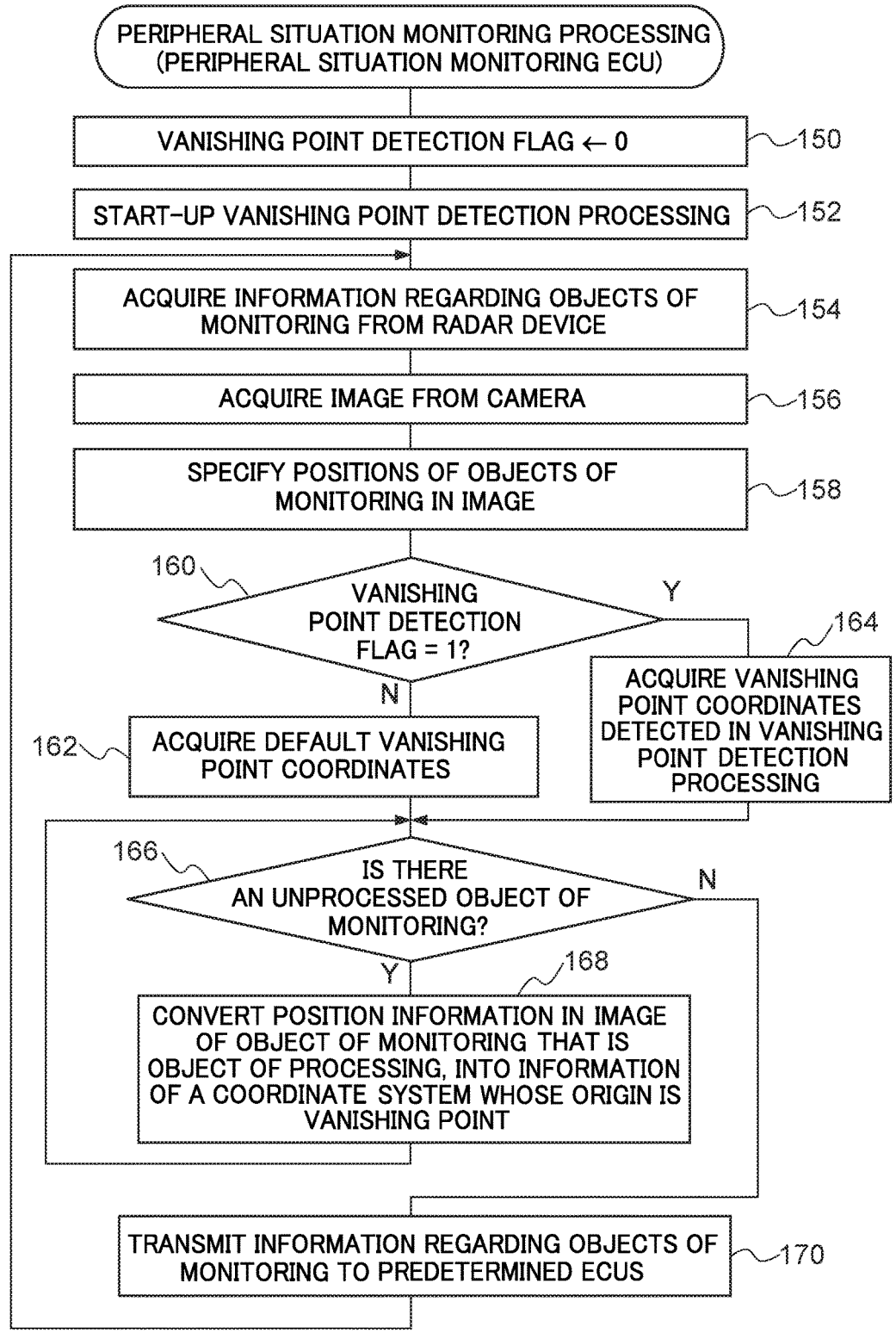

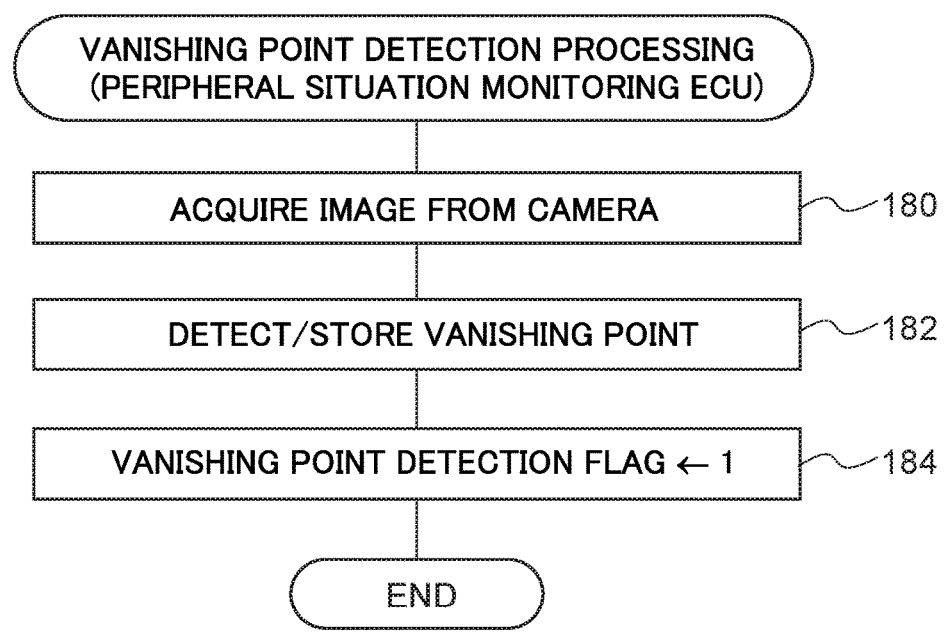

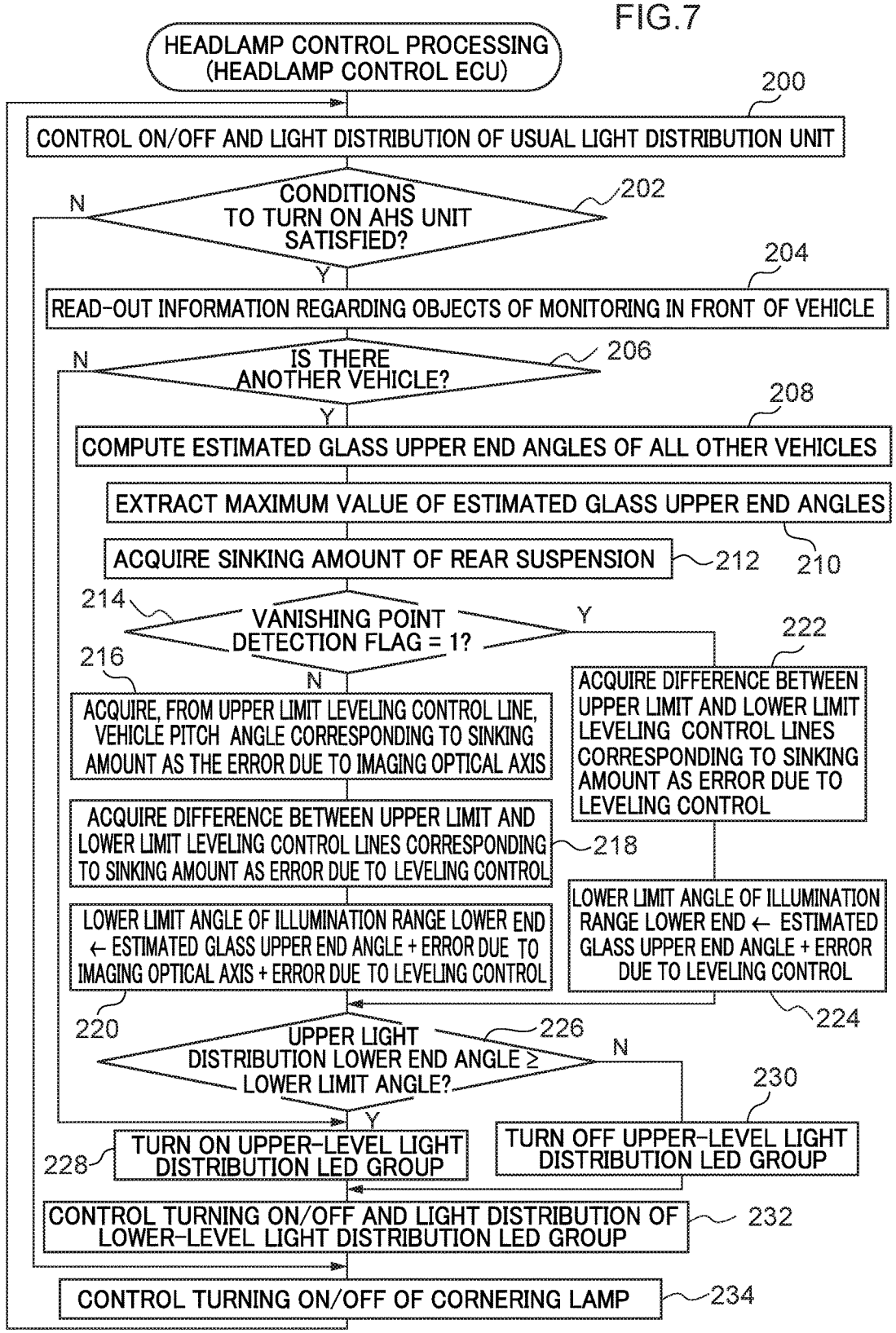

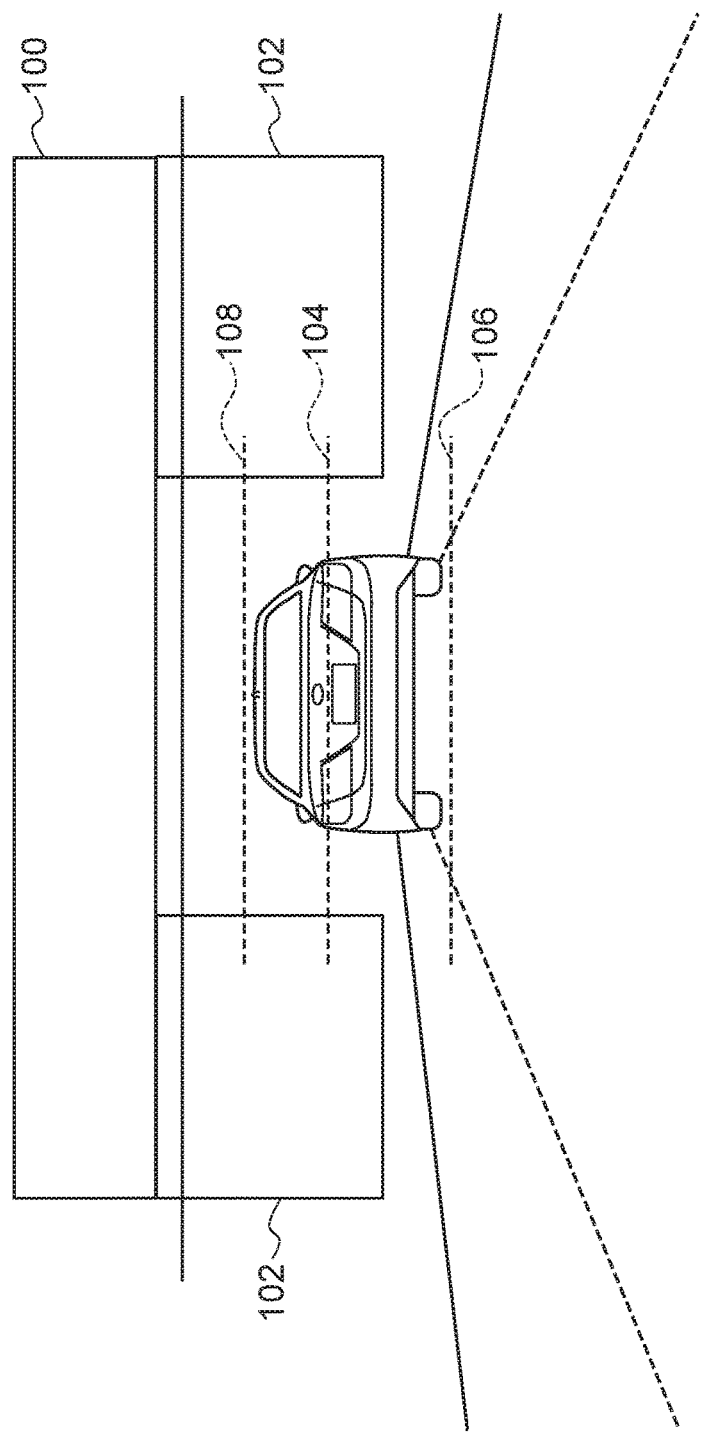

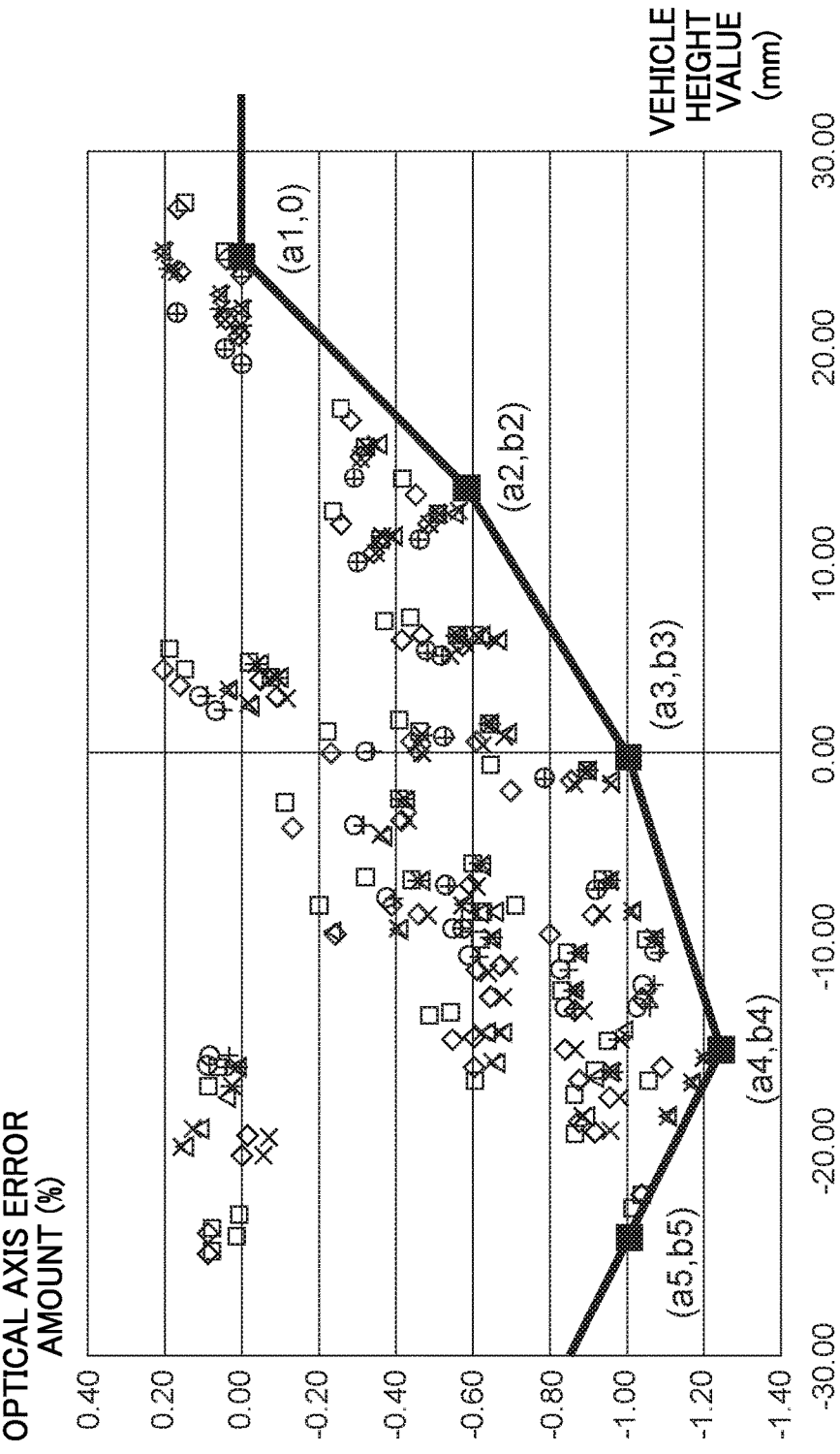

VEHICLE HEADLAMP LIGHT DISTRIBUTION CONTROL DEVICE AND METHOD, AND STORAGE MEDIUM

CROSS-REFERENCE TO RELATED APPLICATION

This application is based on and claims priority under 35 USC 119 from Japanese Patent Application No. 2016-023993, filed on Feb. 10, 2016, the disclosure of which is incorporated by reference herein.

BACKGROUND

Technical Field

The present disclosure relates to a vehicle headlamp light distribution control device, a vehicle headlamp light distribution control method, and a storage medium storing a program of controlling vehicle headlamp light distribution.

Related Art

In the technique disclosed in Japanese Patent Application Laid-Open (JP-A) No. 2013-203130, a headlamp illumination pattern that is adjusted at the time of shipping-out a vehicle is stored as a reference pattern, and, when the vehicle travels, it is judged whether or not conditions for implementing adjustment of the illumination range of the headlamp are established. In a case in which adjustment of the illumination range of the headlamp is to be implemented, the image of a camera that captures images of the region in front of the vehicle is processed, the illumination pattern of the headlamp is recognized, the stored reference pattern and the recognized illumination pattern are compared, and the illumination range of the headlamp is adjusted so that the both match.

The inclination of a vehicle changes in accordance with the number of passengers and the load capacity of the cargo. When the inclination of the vehicle changes, the angle of the imaging optical axis of the imaging section such as an on-board camera that images the region in front of the vehicle changes, and the range of imaging by the imaging section also moves. Therefore, in order to control the light distribution (the illumination range) of the headlamp on the basis of the image of the front region of the vehicle that is captured by the imaging section as in the technique of above-described JP-A No. 2013-203130, a reference position within the image must be detected, and information obtained from the image (e.g., the positions of other vehicles) must be calibrated in accordance with the detected reference position. Note that, for example, the position of the Focus of Expansion (FOE), which is the intersection point of the extensions of plural optical flows within the image, or the position of the vanishing point is used as the aforementioned reference position. Hereinafter, both are referred to as the vanishing point.

However, detection of the reference point within the image is realized by image processing such as, for example, searching for plural regions that correspond to white lines on the road, and approximating, by straight lines, the respective regions extracted by the search, and determining the intersection point of the plural, approximated straight lines, or the like. Thus, time or a traveled distance of a certain extent are needed to detect the reference position. Therefore, there is the possibility that, during the time period until the reference position within the image is detected, the accuracy of the light distribution control of the lamp will deteriorate due to a change in the imaging optical axis, and there is the concern that glare will be imparted to other vehicles or the like that exist in front of the vehicle.

SUMMARY

The present disclosure provides a vehicle headlamp light distribution control device and method, and a storage medium that may reduce the potential of imparting glare to other vehicles, including during the time period until a reference position is detected from an image of the region in front of the vehicle.

A first aspect of the present disclosure is a vehicle headlamp light distribution control device that includes: a detector that is configured to detect a reference position from an image of a frond region of a vehicle; and a controller that is configured to control, during a time period until the reference position is detected by the detector, a light distribution of a headlamp of the vehicle in accordance with a sensed inclination of the vehicle or a physical amount expressing the inclination of the vehicle, and to control, after the reference position is detected by the detector, the light distribution of the headlamp on the basis of calibrated information obtained by calibrating information obtained from the image in accordance with the detected reference position.

In the present aspect, the detector detects a reference position from the image of the region in front of the vehicle that has been captured by the imaging section. The reason why detection of the reference position by the detector is needed is that, when the number of passengers and the load capacity of the cargo changes, the inclination of the vehicle changes, and, due to the imaging optical axis of the imaging section changing in accordance with this change in the inclination, an error is added to the information obtained from the image, such as, for example, the positions of other vehicles and the like. Accordingly, the amount of change in the reference position in the image corresponds to the amount of change in the imaging optical axis, and accordingly, in the amount of change in the inclination of the vehicle. Therefore, the magnitude of the error due to the change in the reference position in the image and that is added to the information obtained from the image, is correlated with the amount of change in the inclination of the vehicle.

On the basis of the above, in the present aspect, during the time period until the reference position is detected by the detector, the controller controls the light distribution of the headlamp of the vehicle in accordance with the inclination of the vehicle, which has been sensed by the sensor, or in accordance with a physical amount that relates to the inclination of the vehicle. Due thereto, during the time period until detection of the reference position by the detector is completed, the effects of the error that is included in the information obtained from the image may be reduced, and the potential of imparting glare to other vehicles may be reduced.

Further, in the present aspect, after the reference position is detected by the detector, the controller controls the light distribution of the headlamp on the basis of information that is obtained by calibrating the information obtained from the image in accordance with the detected reference position. Therefore, also during the time period after the detecting of the reference position by the detector is completed and the above-described control starts, the potential of imparting glare to other vehicles nay be reduced. Accordingly, in accordance with the present aspect, the potential of imparting glare to other vehicles may be reduced, including during the time period until the reference position is detected from the image of the region in front of the vehicle.

In the present aspect, the headlamp may include an upper illumination light source that is configured, in a case in which other vehicle exists in front of the vehicle, to illuminate a region further upward than the other vehicle, and the controller may be configured to control at least one of turning on/off of the upper illumination light source or changing of an illumination range of the upper illumination light source, such that the illumination range of the upper illumination light source does not overlap the other vehicle.

In the above-described structure, the headlamp of the vehicle includes the upper illumination light source for illuminating the region further upward than the other vehicles that exist in front of the vehicle. The light distribution control with respect to the headlamp for usual light distribution is carried out such that the position of the upper edge of the illumination range becomes lower than at least the lower ends of the window portions of the other vehicles. In this case, even if the posture of the vehicle are to be downward toward the front more than supposed, the direction of the change in the illumination range that accompanies the change in the posture of the vehicle is a direction in which the outer edge of the upper side of the illumination range moves further downward, i.e., a direction in which it is less likely to impart glare to other vehicles.

In a case in which a region that is further upward than the other vehicles in front of the vehicle is illuminated, the direction of the change in the illumination range at the time when the posture of the vehicle is downward toward the front more than supposed, is a direction in which the lower edge of the illumination range moves further downward, i.e., a direction in which it is likely to impart glare to other vehicles. Therefore, in a case of illuminating the region that is further upward than the other vehicles in front of the vehicle, measures are required to make it such that glare is not imparted to other vehicles also at times when the posture of the vehicle is downward toward the front more than supposed.

In this regard, in the above-described structure, the controller controls at least one of the turning on/off of the upper illumination light source and the change in the illumination range of the upper illumination light source, such that the illumination range of the upper illumination light source does not overlap other vehicles. Due thereto, even if the posture of the vehicle is downward toward the front more than supposed, a region that is further upward than other vehicles that exist in front of the vehicle may be illuminated while the potential of imparting glare to the other vehicles may be reduced.

In the present aspect, the vehicle is configured to sense a vehicle height of a rear portion of the vehicle as the physical amount relating to the inclination of the vehicle, and, on the basis of a relationship between the vehicle height of the rear portion of the vehicle and an upper limit value of the inclination of the vehicle or a value within a predetermined range from the upper limit value, to control an optical axis of the headlamp by determining that the vehicle is tilting as much as the upper limit value that corresponds to the sensed vehicle height or a value within the predetermined range from the upper limit value, and the controller may be configured, during the time period until the reference position is detected, to determine an upper limit value of the inclination of the vehicle that corresponds to the sensed vehicle height, or a value within the predetermined range from the upper limit value, and to control the upper illumination light source by using a target position of a lower edge of an illumination range of the upper illumination light source that is determined on the basis of uncalibrated information obtained from the image, the target position being a position for setting the illumination range to not overlap the other vehicle, and the determined upper limit value of the inclination of the vehicle or the determined value within a predetermined range from the upper limit value.

As described above, vehicles may be installed with a sensor that senses the vehicle height of the rear portion of the vehicle, and a leveling control mechanism that controls an optical axis of the headlamp, on the basis of a predetermined relationship between the vehicle height of the rear portion of the vehicle and the upper limit value of the inclination of the vehicle or a value within a predetermined range from this upper limit value, by determining that the vehicle is tilting as much as the upper limit value that corresponds to the sensed vehicle height of the rear portion of the vehicle or a value within a predetermined range from this upper limit value. In the above-described structure, the inclination of the vehicle cannot be sensed accurately, and the inclination of the vehicle is not determined uniquely from the sensed vehicle height. Therefore, the leveling controller controls the optical axis of the headlamp by determining that the vehicle is tilting as much as the upper limit value of the inclination of the vehicle that corresponds to the sensed vehicle height of the rear portion of the vehicle, or as much as a value within a predetermined range from that upper limit value.

Further, in the above-described structure, during the time period until the reference position is detected, the controller controls the upper illumination light source by using a target position of the lower edge of the illumination range of the upper illumination light source that is determined on the basis of uncalibrated information obtained from the image and that is for the illumination range to not overlap other vehicles. An error due to the change in the imaging optical axis that accompanies the change in the inclination of the vehicle is added to the uncalibrated information obtained from the image. However, it is clear that the inclination of the vehicle, at a vehicle in which the above-described leveling control mechanism is installed, is the above-described upper limit value of the inclination of the vehicle or is less than or equal to a value within a predetermined range from this upper limit value. Therefore, by utilizing this, the controller determines the upper limit value of the inclination of the vehicle that corresponds to the sensed vehicle height of the rear portion of the vehicle, or a value within a predetermined range from this upper limit value, and controls the upper illumination light source by also using this determined upper limit value of the inclination of the vehicle or this determined value that is within a predetermined range from the upper limit value. Due thereto, the potential of imparting glare to other vehicles due to a change in the imaging optical axis that accompanies a change in the inclination of the vehicle may be reduced by simple processing.

In the present aspect, the vehicle is configured to sense a vehicle height of a rear portion of the vehicle as the physical amount relating to the inclination of the vehicle, and, on the basis of a relationship between the vehicle height of the rear portion of the vehicle and an upper limit value of the inclination of the vehicle or a value within a predetermined range from the upper limit value, to control an optical axis of the headlamp by determining that the vehicle is tilting as much as the upper limit value that corresponds to the sensed vehicle height or a value within the predetermined range from the upper limit value, and the controller may be configured, on the basis of a relationship between the vehicle height and a magnitude of a range of inclination of the vehicle, to determine a magnitude of the range of inclination of the vehicle that corresponds to the sensed vehicle height, and to control the upper illumination light source by using the determined magnitude of the range of inclination of the vehicle, and a target position of a lower edge of an illumination range of the upper illumination light source that is determined on the basis of uncalibrated information obtained from the image, the target position being a position for setting the illumination range to not overlap the other vehicle.

As described above, in a vehicle structure in which the above-described sensor and leveling control mechanism are installed, the inclination of the vehicle cannot be sensed accurately, and the inclination of the vehicle is not determined uniquely from the sensed vehicle height. Therefore, the leveling controller controls the optical axis of the headlamp by determining that the vehicle is tilting as much as an upper limit value of the inclination of the vehicle that corresponds to the sensed vehicle height of the rear portion of the vehicle, or as much as a value within a predetermined range from this upper limit value. Since there is an error in the control by the leveling control mechanism, in a case in which the actual inclination of the vehicle is smaller than the upper limit value or a value within a predetermined range from this upper limit value, the optical axis of the headlamp is directed further downward than in a case in which the inclination of the vehicle is the upper limit value or is a value within a predetermined range from this upper limit value. Therefore, there is the possibility that the illumination range of the upper illumination light source will impart glare to other vehicles.

However, in the above-described structure, the controller determines the magnitude of the range of inclination of the vehicle that corresponds to the sensed vehicle height of the rear portion of the vehicle on the basis of a predetermined relationship between the vehicle height of the rear portion of the vehicle and the range of inclination of the vehicle (the magnitude of this range of inclination of the vehicle corresponds to the magnitude of the control error of the leveling control mechanism). Then, the controller controls the upper illumination light source by using the determined magnitude of the range of inclination of the vehicle, and a target position of the lower edge of the illumination range of the upper illumination light source that is determined on the basis of uncalibrated information obtained from the image and that is for the illumination range to not overlap other vehicles. Due thereto, the potential of imparting glare to other vehicles due to the control error of the leveling control mechanism may also be reduced.

A second aspect of the present disclosure is a vehicle headlamp light distribution control method that includes: detecting a reference position from a captured image of a region in front of a vehicle; during a time period until the reference position is detected, controlling a light distribution of a headlamp of the vehicle in accordance with a sensed inclination of the vehicle or a physical amount expressing the inclination of the vehicle; and after the reference position is detected, controlling the light distribution of the headlamp on the basis of calibrated information obtained by calibrating information obtained from the captured image, in accordance with the detected reference position.

A third aspect of the present disclosure is a non-transitory storage medium that stores a program causing a computer to execute a vehicle headlamp light distribution control processing, the vehicle headlamp light distribution control processing including: detecting a reference position from a captured image of a region in front of a vehicle; during a time period until the reference position is detected, controlling a light distribution of a headlamp of the vehicle in accordance with a sensed inclination of the vehicle or a physical amount expressing the inclination of the vehicle; and after the reference position is detected, controlling the light distribution of the headlamp on the basis of calibrated information obtained by calibrating information obtained from the captured image, in accordance with the detected reference position.

Similarly to the first aspect, the potential of imparting glare to other vehicles may be thereby reduced, including during the time period until the reference position is detected from the image of the region in front of the vehicle.

BRIEF DESCRIPTION OF THE DRAWINGS

Exemplary embodiments of the present disclosure will be described in detail based on the following figures, wherein:

FIG. 5 is a flowchart illustrating an example of peripheral situation monitoring processing;

FIG. 6 is a flowchart illustrating an example of vanishing point detection processing;

FIG. 7 is a flowchart illustrating an example of headlamp control processing;

FIG. 9 is a schematic drawing for explaining the contents of the headlamp control processing;

FIG. 13 is a scatter diagram for explaining derivation of a leveling control line (lower limit).

DETAILED DESCRIPTION

Figure 1:
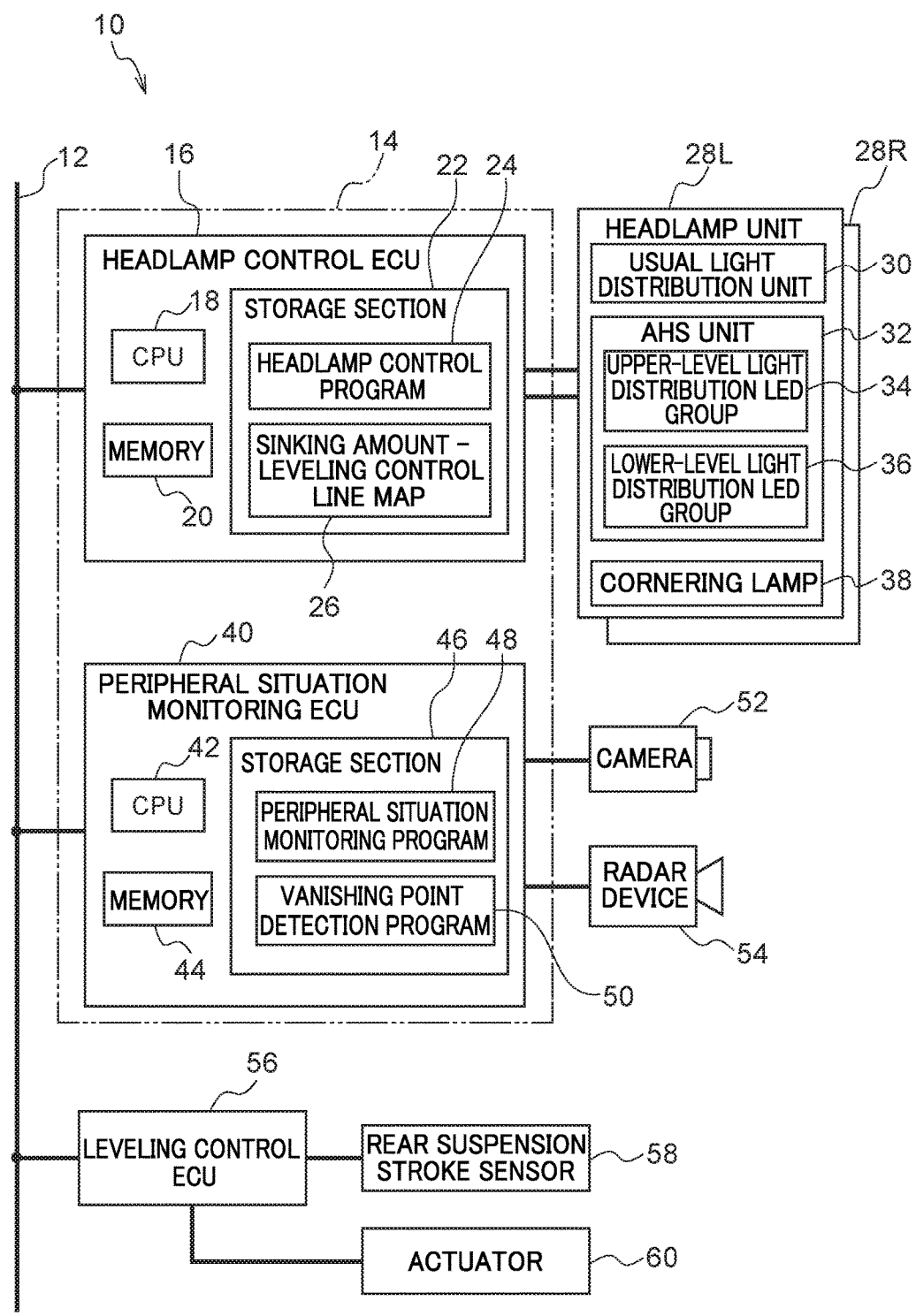
FIG. 1 is a schematic block diagram illustrating a portion of an on-board system that includes a vehicle headlamp light distribution control device.

An example of an embodiment of the present disclosure is described in detail hereinafter with reference to the drawings. An on-board system 10 illustrated in FIG. 1 includes a bus 12 to which are respectively connected plural electronic control units (processors, hereinafter referred to as "ECUs" that respectively include a CPU, a memory and a non-volatile storage section) that carry out mutually different controls. Note that FIG. 1 illustrates only a portion of the on-board system 10. Further, in the following description, the vehicle in which the on-board system 10 is installed is referred to as the own (local) vehicle.

A headlamp control ECU 16 and a peripheral situation monitoring ECU 40, which are included in a vehicle headlamp light distribution control device 14, as well as a leveling control ECU 56 are respectively connected to the bus 12. The vehicle headlamp light distribution control device 14 is an example of the vehicle headlamp light distribution control device relating to the present disclosure.

The headlamp control ECU 16 includes a CPU 18, a memory 20, and a non-volatile storage section 22 that stores a headlamp control program 24 and a sinking amount-leveling control line map 26. Headlamp units 28L, 28R that are disposed at the left and right of the front end portion of the own vehicle are respectively connected to the headlamp control ECU 16. Note that the left and right headlamp units 28L, 28R are structures that are symmetrical with respect to the longitudinal axis of the vehicle (see FIG. 2 as well), and hereinafter, the headlamp unit 28L at the left side will be described as an example.

The headlamp unit 28L includes a usual light distribution unit 30, an adaptive high-beam system unit 32 (hereinafter referred to as AHS unit 32), and a cornering lamp 38. The AHS unit 32 includes an upper-level light distribution LED group 34 and a lower-level light distribution LED group 36. The turning on/off of the usual light distribution unit 30, the AHS unit 32 and the cornering lamp 38 are controlled by the headlamp control ECU 16. The headlamp control ECU 16 is an example of the controller in the present disclosure.

Figure 4A:
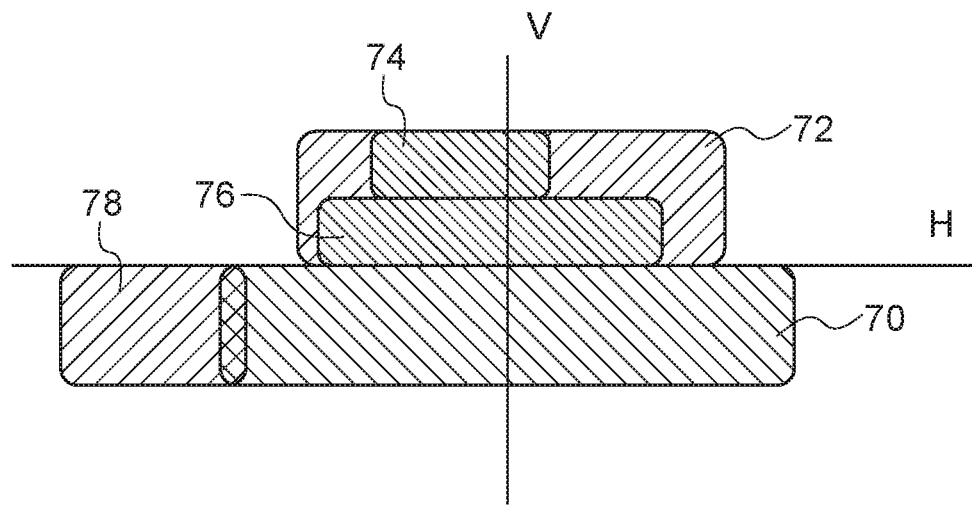
FIG. 4A is a schematic drawing illustrating an example of a light distribution pattern of a headlamp unit at a left side.

The usual light distribution unit 30 includes LEDs, and a light-blocking mechanism that switches the illumination range of the light emitted from the LEDs to either an illumination range 70 that corresponds to low-beams and is illustrated in FIG. 4A, or to an illumination range in which an illumination range 72 that corresponds to high-beams illustrated in FIG. 4A is added to the illumination range 70.

Figure 2:
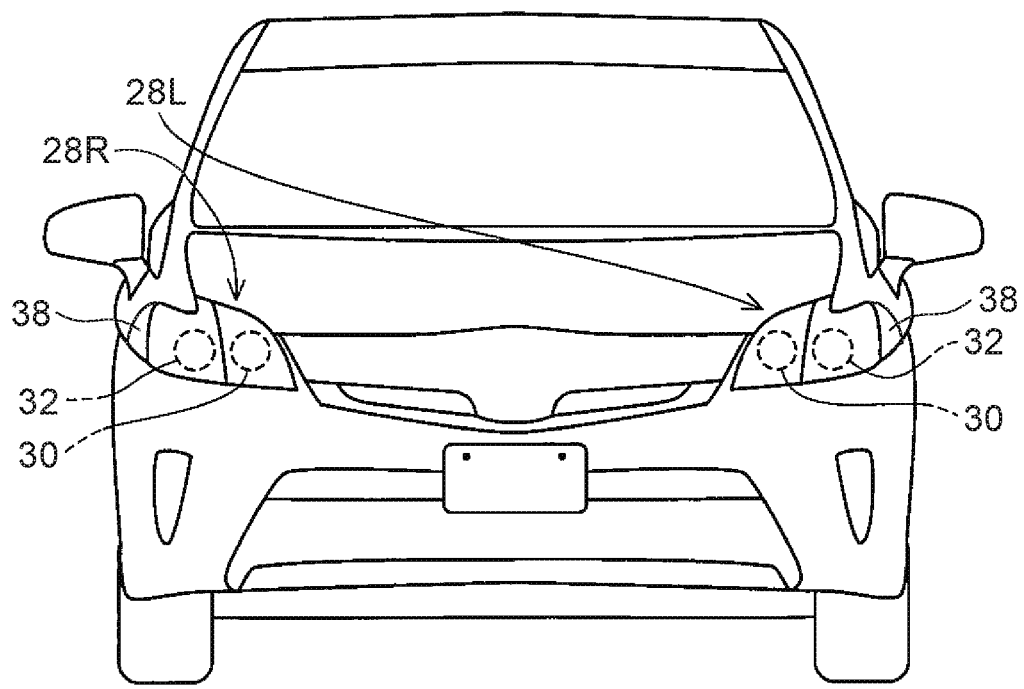
FIG. 2 is a front view of a vehicle in which headlamp units are installed.
Figure 3:
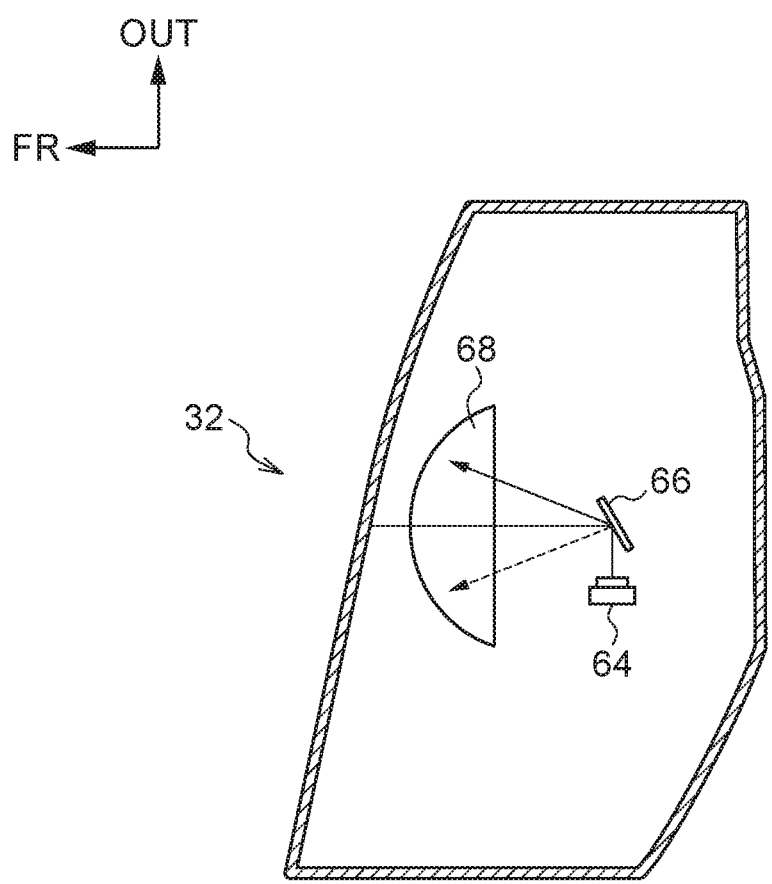
FIG. 3 is a cross-sectional view of an adaptive high-beam system (AHS) unit.

As illustrated in FIG. 2, the AHS unit 32 is disposed adjacent to the vehicle outer side of the usual light distribution unit 30. As illustrated in FIG. 3, the AHS unit 32 incorporates an LED array light source 64 therein. The LED array light source 64 includes plural LED chips that correspond to the upper-level light distribution LED group 34, and plural LED chips that correspond to the lower-level light distribution LED group 36. As an example, the number of LED chips that correspond to the upper-level light distribution LED group 34 may be 8, and the number of LED chips that correspond to the lower-level light distribution LED group 36 may be 16.

A reflector 66 and a lens 68 are disposed in that order at the light emitting side of the LED array light source 64. The light emitted from the LED array light source 64 is reflected by the reflector 66, and is refracted by the lens 68, and is emitted from the AHS unit 32.

When the LED chips corresponding to the upper-level light distribution LED group 34 are all turned on, as illustrated as illumination range 74 in FIG. 4A, the upper-level light distribution LED group 34 illuminates a partial region of the upper half of illumination range 72 that corresponds to high-beams. Note that, when the upper-level light distribution LED groups 34 of the left and right headlamp units 28L, 28R are respectively turned on, due to the lights emitted from the respective upper-level light distribution LED groups 34 overlapping one another, the range illustrated as illumination range 100 in FIG. 9 for example among the region in front of the own vehicle, i.e., a range that is higher than other vehicles, is illuminated. Further, when the LED chips corresponding to the lower-level light distribution LED group 36 are all turned on, as illustrated as illumination range 76 in FIG. 4A, the lower-level light distribution LED group 36 illuminates a region that is the majority of the lower half of the illumination range 72 that corresponds to high-beams.

The light distribution angles in the vehicle transverse direction of the individual LED chips that are included in the LED groups 34, 36 are different from one another. In accordance with the absence/presence of other vehicles that exist in the periphery of the own vehicle (other vehicles in the present embodiment include both preceding vehicles of and oncoming vehicles of the own vehicle), and the positions of the other vehicles in a case in which other vehicles exist, the headlamp control ECU 16 controls turning on/off of the lower-level light distribution LED group 36 in units of the individual LED chips such that the illumination range of the light from the lower-level light distribution LED group 36 does not overlap other vehicles.

Accordingly, the illumination range 76 of the lower-level light distribution LED group 36 that is illustrated in FIG. 4A changes to an illumination range that corresponds to the LED chips that are turned on among the lower-level light distribution LED group 36, due to the turning on/off control per LED chip unit by the headlamp control ECU 16. An example of the illumination range of the light from the lower-level light distribution LED group 36, in a case in which turning on/off of the lower-level light distribution LED group 36 is controlled per LED chip unit in order for the illumination range of the light from the lower-level light distribution LED group 36 to not overlap other vehicles, is illustrated as illumination range 102 in FIG. 9.

In the present embodiment, the headlamp control ECU 16 controls the turning on/off of the upper-level light distribution LED group 34 with all of the LED chips of the upper-level light distribution LED group 34 being a unit, and in accordance with the absence/presence of other vehicles and the positions of other vehicles. However, the present disclosure is not limited to this, and, similarly to the control with respect to the lower-level light distribution LED group 36, turning on/off with respect to the upper-level light distribution LED group 34 as well may be controlled in units of the individual LED chips, or in units of groups of LED chips that respectively include plural LED chips.

As illustrated in FIG. 2, the cornering lamp 38 is disposed adjacent to the vehicle outer side of the AHS unit 32. The cornering lamp 38 also includes LEDs as the light source. When these LEDs are turned on, the region adjacent to the vehicle outer side of the illumination range 70 that corresponds to low-beams is illuminated as illustrated as illumination range 78 in FIG. 4A.

Figure 4B:
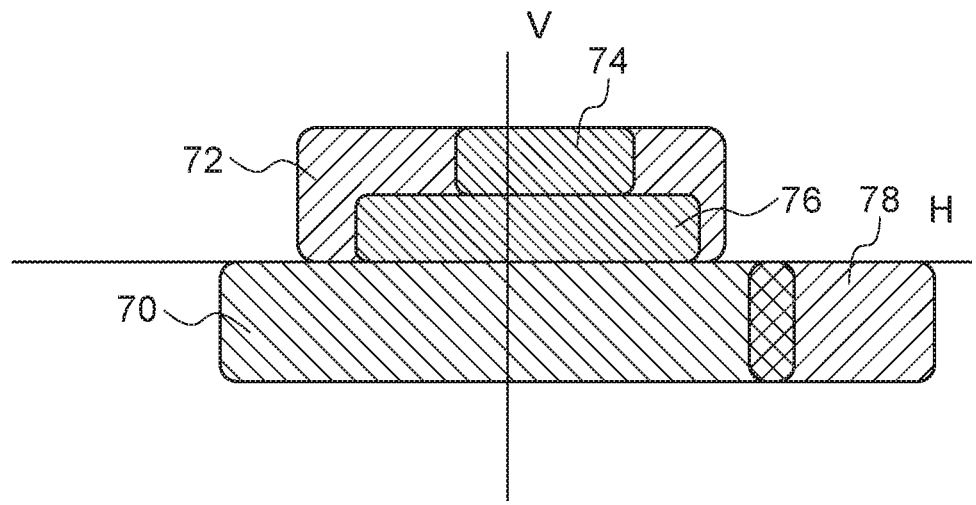
FIG. 4B is a schematic drawing illustrating an example of a light distribution pattern of a headlamp unit at a right side.

The light distribution pattern of the headlamp unit 28R at the right side is illustrated in FIG. 4B with reference numerals, which are the same as those of the corresponding illumination regions illustrated in FIG. 4A, being applied to the individual illumination regions. As is clear from FIGS. 4A and 4B, the light distribution pattern of the headlamp unit 28R at the right side is approximately symmetrical, with respect to the longitudinal axis of the vehicle, to the light distribution pattern of the headlamp unit 28L at the left side.

Note that the left and right headlamp units 28L, 28R are examples of the headlamps in the present disclosure, and the respective upper-level light distribution LED groups 34 of the headlamp units 28L, 28R are examples of the upper illumination light source in the present disclosure.

Further, as illustrated in FIG. 1, the peripheral situation monitoring ECU 40 includes a CPU 42, a memory 44, and a non-volatile storage section 46 that stores a peripheral situation monitoring program 48 and a vanishing point detection program 50. A camera 52 and a radar device 54 are connected to the peripheral situation monitoring ECU 40. The camera 52 captures images of the periphery of the own vehicle including at least the region in front of the own vehicle, and outputs the captured images to the peripheral situation monitoring ECU 40. Note that the camera 52 may include plural cameras whose imaging ranges differ from one another, including a camera that captures images of the region in front of the own vehicle.

The radar device 54 detects, as point information, objects such as pedestrians or other vehicles or the like that exist at the periphery of the own vehicle including at least the region in front of the own vehicle, and acquires the relative positions and the relative speeds of the own vehicle and the detected objects. Further, the radar device 54 incorporates therein a processing device that processes detection results of the objects at the periphery. On the basis of changes and the like in the relative positions and the relative speeds between the own vehicle and the individual objects that are included in the detection results of the most recent plural times, this processing device excludes, from objects of monitoring, noise and roadside objects such as guardrails and the like, and tracks and monitors specific objects, such as pedestrians or other vehicles or the like, as objects of monitoring. Then, the radar device 54 outputs information, such as the relative positions and the relative speeds and the like between the own vehicle and the individual objects of monitoring, to the peripheral situation monitoring ECU 40.

On the basis of information such as the relative positions and the like between the own vehicle and the individual objects of monitoring that has been inputted from the radar device 54, the peripheral situation monitoring ECU 40 detects the positions of the individual objects of monitoring in the image inputted from the camera 52. Further, the peripheral situation monitoring ECU 40 extracts characteristic amounts of the individual object of monitoring, and judges the types (whether it is a pedestrian or a vehicle or the like) of the objects of monitoring on the basis of the extracted characteristic amounts. Then, the peripheral situation monitoring ECU 40 carries out peripheral situation monitoring processing in which, by repeating the above-described processings, the peripheral situation monitoring ECU 40 tracks and monitors the objects of monitoring in the same way as the radar device 54, and transmits information regarding the individual objects of monitoring to specific ECUs within the on-board system 10 including the headlamp control ECU 16. Note that the specific ECUs may include, for example, an ECU that carries out the processing of predicting collisions between the own vehicle and objects of monitoring.

Further, each time the ignition switch of the own vehicle is turned on, the peripheral situation monitoring ECU 40 carries out vanishing point detection processing that detects the position of the vanishing point (FOE) from the image of the region in front of the own vehicle that has been captured by the camera 52. Then, after the position detection of the vanishing point is completed, the peripheral situation monitoring ECU 40 calibrates the position information, that is included in the information regarding the objects of monitoring that has been transmitted to the headlamp control ECU 16 and the like, into position information whose reference is the detected position of the vanishing point. In this way, the camera 52 is an example of the imaging section in the present disclosure, and the peripheral situation monitoring ECU 40 is an example of the detector in the present disclosure.

Further, a stroke sensor 58, that senses the sinking amount of the rear suspension of the own vehicle, and actuators 60, by which it is possible to change the optical axes of the headlamp units 28L, 28R in the pitch direction of the own vehicle by the driving force of motors or the like, are connected to the leveling control ECU 56. Note that the actuators 60 may be configured such that change the optical axes by changing, in the pitch direction, the inclinations of the reflectors that are incorporated in the individual units included in the headlamp units 28L, 28R, or may be configured such that change the optical axes by changing the inclinations of the headlamp units 28 overall in the pitch direction.

On the basis of the sinking amount of the rear suspension of the own vehicle that has been sensed by the stroke sensor 58, the leveling control ECU 56 carries out leveling control of maintaining, by the actuators 60, the optical axes of the headlamp units 28L, 28R at less than or equal to a predetermined angle (as an example, less than or equal to $-1.0\%$ ($-0.57°$)) with respect to horizontal. However, in the present embodiment, the stroke sensor 58 is provided only at the rear suspension of the own vehicle, and the inclination of the vehicle in the pitch direction cannot be accurately sensed by only the sinking amount of the rear suspension that has been sensed by the stroke sensor 58. Therefore, the inclination of the own vehicle in the pitch direction cannot be determined uniquely from the sensed sinking amount of the rear suspension.

Therefore, on the basis of a predetermined relationship between the sinking amount of the rear suspension of the own vehicle and the upper limit value of the inclination of the own vehicle in the pitch direction, the leveling control ECU 56 determined that the own vehicle is tilting as much as the upper limit value that corresponds to the sensed sinking amount, and controls the optical axes of the headlamp units 28L, 28R. Note that, instead of the aforementioned upper limit value, a value within a predetermined range from the aforementioned upper limit value may be used. The stroke sensor 58 is an example of the sensor (in further detail, the sensor that senses the vehicle height of the rear portion of the vehicle as a physical amount relating to the inclination of the vehicle) in the present disclosure, and the leveling control ECU 56 and the actuators 60 are an example of the leveling control mechanism in the present disclosure.

Processings carried out by the peripheral situation monitoring ECU 40 will be described next as operation of the present embodiment, first with reference to FIGS. 5 and 6. After the ignition switch of the own vehicle is turned on, the peripheral situation monitoring ECU 40 carries out the peripheral situation monitoring processing illustrated in FIG. 5 by the CPU 42 executing the peripheral situation monitoring program 48.

In step 150 of the peripheral situation monitoring processing, the peripheral situation monitoring ECU 40 sets a vanishing point detection flag to 0. Note that the vanishing point detection flag is stored in a region that may be referenced from the headlamp control ECU 16 as well (e.g., this may be a common region that is set at a storage region at the storage section 46, or may be a common region that is provided within the on-board system 10 and outside of the peripheral situation monitoring ECU 40). Further, in next step 152, the peripheral situation monitoring ECU 40 startsup vanishing point detection processing. The vanishing point detection processing is described hereinafter.

Figure 8A:
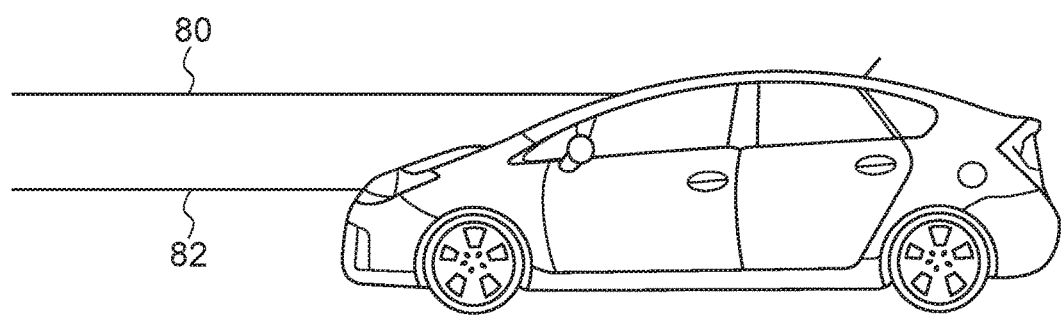
FIG. 8A is a schematic drawing illustrating an example of an imaging optical axis of a camera in a state in which one passenger is in a vehicle.

When the vehicle is in a standard loaded state (as an example, a state in which there is a single passenger and cargo is not loaded in the vehicle) at the time when the vehicle is shipped-out from the factory, as illustrated in FIG. 8A, the inclination of the camera 52 in the pitch direction is adjusted such that imaging optical axis 80 of the camera 52 is parallel to horizontal line 82. Further, the position of the vanishing point within the captured image in the state in which the imaging optical axis 80 being parallel to the horizontal line 82 is fixedly stored, as the default vanishing point position, in the storage section 46 of the peripheral situation monitoring ECU 40 for example.

Figure 8B:
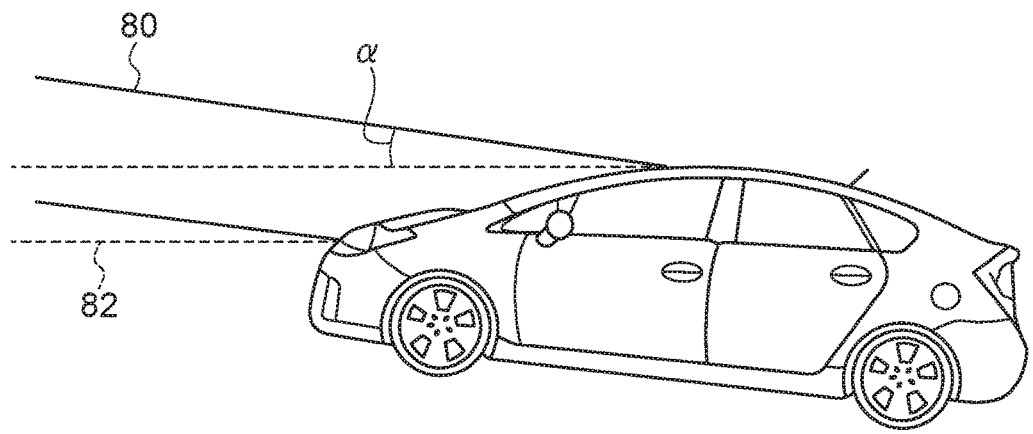
FIG. 8B is a schematic drawing illustrating an example of the imaging optical axis of the camera when the vehicle is in a maximum loaded state.

The loaded state of the vehicle (the number of passengers and the load capacity of cargo) may change each time that the vehicle is used, and, when the loaded state of the vehicle changes, the inclination of the vehicle in the pitch direction changes. When the inclination of the vehicle in the pitch direction changes, the imaging optical axis 80 of the camera 52 becomes non-parallel to the horizontal line 82 (for example, refer to angle difference a in FIG. 8B that illustrates the maximum loaded state of the vehicle), and the vanishing point position within the captured image changes from the default vanishing point position (an error corresponding to the angle difference a is added thereto).

The position information, which is included in the information regarding the objects of monitoring and that is transmitted from the peripheral situation monitoring ECU 40, is position information in which the vanishing point position is the origin. Therefore, if an error is added to the vanishing point position, the accuracy of the position information deteriorates, and the accuracy of the control by the specific ECUs (e.g., the headlamp control ECU 16), which receive the information regarding the objects of monitoring from the peripheral situation monitoring ECU 40 and carry out some type of control, also deteriorates. Therefore, at the peripheral situation monitoring ECU 40, each time when the ignition switch of the own vehicle is turned on, the execution of step 152 of the peripheral situation monitoring processing acts as a trigger for the CPU 42 to execute the vanishing point detection program 50, and due thereto, the peripheral situation monitoring ECU 40 carries out the vanishing point detection processing illustrated in FIG. 6.

In step 180 of the vanishing point detection processing, the peripheral situation monitoring ECU 40 acquires a captured image from the camera 52. In next step 182, the peripheral situation monitoring ECU 40 detects the vanishing point by carrying out the image processing of searching for plural regions that correspond to, for example, the white lines of the road, from the captured image that has been acquired in step 180, and approximating, by straight lines, the respective regions that have been extracted in the search, and determining the intersection point of the plural straight lines that have been approximated. Further, the peripheral situation monitoring ECU 40 stores the position (the coordinates) of the detected vanishing point in a predetermined storage region of the storage section 22. Then, in step 184, the peripheral situation monitoring ECU 40 sets the vanishing point detection flag to 1, and ends the vanishing point detection processing.

Next, the processings from step 154 on of the peripheral situation monitoring processing are described. In step 154, the peripheral situation monitoring ECU 40 acquires the information regarding the objects of monitoring from the radar device 54, and, in next step 156, acquires the captured image from the camera 52.

In step 158, on the basis of the information regarding the objects of monitoring that has been acquired from the radar device 54, the peripheral situation monitoring ECU 40 discriminates specific points in the captured image of objects of monitoring, and adds, to the information regarding the objects of monitoring, position information (the angles of the specific positions in the pitch direction, hereinafter called the pitch angles) that express the discriminated specific positions. Note that, in a case in which another vehicle whose lamps are on is included among the objects of monitoring, the peripheral situation monitoring ECU 40 utilizes, for example, the position (refer also to broken line 104 illustrated in FIG. 9) of the upper end of the lamp region of the other vehicle in the captured image (the region of the tail lamps in the case of a preceding vehicle, and the region of the headlamps in the case of an oncoming vehicle), as the specific position in the captured image at least for another vehicle whose lamps are on.

Note that, instead of the upper end position of the lamp region of another vehicle, for example, the lower end position of the lamp region of another vehicle may be used as the specific position, or another position such as the lower end position of another vehicle (refer also to broken line 106 illustrated in FIG. 9) of the other vehicle may also be used as the specific position. Further, cases may also arise in which the information regarding the objects of monitoring that is acquired from the radar device 54 is information that expresses that an object of monitoring does not exist in the periphery of the own vehicle. In such a case, the processing of step 158 is skipped.

In next step 160, by judging whether or not the vanishing point detection flag is set to 1, the peripheral situation monitoring ECU 40 judges whether or not detection of the vanishing point is completed. Because detection of the vanishing point is realized by image processing as described above, during the time period from the ignition switch of the own vehicle being turned on until the detection of the vanishing point is completed, the own vehicle must travel a distance of a certain extent, and time of a certain extent is required (there is also the possibility that this time will increase or decrease in accordance with the traveling situation of the own vehicle or the like).

During the time period until detection of the vanishing point is completed, the judgment of step 160 is negative, and the routine proceeds to step 162. In step 162, the peripheral situation monitoring ECU 40 acquires, from the storage section 46, the default vanishing point position (coordinates) that has been fixedly stored in the storage section 46, and the routine proceeds to step 166. After detection of the vanishing point is completed, the judgment of step 160 is affirmative, and the routine proceeds to step 164. In step 164, the peripheral situation monitoring ECU 40 acquires, from the storage section 46, the vanishing point position (coordinates) that has been detected in the vanishing point detection processing and has been stored in a predetermined storage region of the storage section 22, and the routine proceeds to step 166.

In step 166, the peripheral situation monitoring ECU 40 judges whether or not, among the objects of monitoring whose specific positions in the captured image have been discriminated in previous step 158, there remains an object of monitoring for which the processing of next step 168 has not yet been executed. In a case in which the information regarding the objects of monitoring that has been acquired from the radar device 54 is information expressing that one or more objects of monitoring exist at the periphery of the own vehicle, the judgment of step 166 is affirmative, and the routine proceeds to step 168.

In step 168, the peripheral situation monitoring ECU 40 selects, as an object of processing, one of the objects of monitoring from among the objects of monitoring for which the processing of step 168 has not yet been executed. The peripheral situation monitoring ECU 40 converts the position information that expresses the specific position in the captured image and that has been added to the information regarding the object of monitoring selected as the object of processing, into information whose origin is the vanishing point position that has been acquired in step 162 or step 164. Specifically, the pitch angle, that expresses a specific position in the captured image, which is expressed by the position information, is converted into a pitch angle in a case in which the vanishing point position in the captured image is 0° (horizontal). After the processing of step 168 is carried out, the routine returns to step 166, and steps 166, 168 are repeated until the processing of step 168 is carried out for all of the objects of monitoring.

In a case in which the processing of step 168 is completed for all of the objects of monitoring, or the information regarding the objects of monitoring that has been acquired from the radar device 54 expresses that an object of monitoring does not exist at the periphery of the own vehicle, the judgment of step 166 is negative, and the routine proceeds on to step 170. In step 170, the peripheral situation monitoring ECU 40 transmits the information regarding the objects of monitoring that has been obtained by the above-described processing to the specific ECUs including the headlamp control ECU 16, and the routine returns to step 154.

Due to the above-described peripheral situation monitoring processing, information regarding the objects of monitoring is repeatedly transmitted from the peripheral situation monitoring ECU 40 to the specific ECUs. Further, during the time period until the vanishing point position is detected (i.e., the time period when the vanishing point detection flag=0), the position information that is included in the transmitted information regarding the objects of monitoring is position information that expresses the specific positions with the default vanishing point position being the origin. After the vanishing point position is detected (i.e., after the vanishing point detection flag becomes 1), the position information that is included in the transmitted information regarding the objects of monitoring is calibrated into position information that expresses specific positions with the detected vanishing point position being the origin.

On the other hand, during the time when the ignition switch of the own vehicle is on, the headlamp control ECU 16 carries out the headlamp control processing illustrated in FIG. 7 by the CPU 18 executing the headlamp control program 24.

In step 200 of the headlamp control processing, the headlamp control ECU 16 controls the turning on/off of the usual light distribution units 30 of the headlamp units 28L, 28R and the light distribution in cases of turning on the usual light distribution units 30. Detailed description of the controlling of the usual light distribution units 30 is omitted, but the control described hereinafter may be used as an example thereof.

In a case in which the illuminance detected by an illumination sensor installed in the own vehicle is greater than or equal to a predetermined illuminance, the usual light distribution units 30 are turned off. In a case in which the detected illuminance is less than the predetermined illuminance, the usual light distribution units 30 are turned on, and the illumination range of the lights emitted from the usual light distribution units 30 is controlled to become the illumination range 70 (refer to FIGS. 4A, 4B) that corresponds to low-beams. Further, while the usual illumination units 30 are on, whether or not the illumination range of the lights emitted from the usual light distribution units 30 is to be switched from the illumination range 70 corresponding to low beams to an illumination range, in which the illumination range 72 corresponding to high beams (refer to FIGS. 4A, 4B) is added to the illumination range 70, is selected on the basis of whether or not another vehicle exists in front of the own vehicle and the brightness of the entire captured image. Note that control of the usual light distribution units 30 is not limited to that described above, and control other than that described above may be applied.

In next step 202, the headlamp control ECU 16 judges whether or not the current situation of the own vehicle satisfies conditions for turning the AHS unit 32 on. An example of the conditions for turning the AHS unit 32 on is, in a state in which the usual light distribution unit 30 is on, a case in which all of the following conditions are satisfied: (1) the vehicle speed of the own vehicle is greater than or equal to a predetermined speed S5 (as an example, S5=30 km/h), (2) the average intensity of the region, in the captured image, that corresponds to the front region of the own vehicle is less than a predetermined intensity, and (3) another vehicle whose lamps are on exists in front of the own vehicle. However, the conditions for turning the AHS unit 32 on are not limited to these conditions. Note that, in the present embodiment, condition (3) is judged in step 206 that will be described hereinafter, and therefore, condition (3) may be excluded from the judgment of step 202.

In a case in which the current situation of the own vehicle does not satisfy the conditions for turning the AHS unit 32 on, the judgment of step 202 is negative, and the routine proceeds to step 234. In step 234, the headlamp control ECU 16 controls the turning on/off of the cornering lamp 38. Since a known control may be applied for the control for turning the cornering lamp 38 on/off, description thereof is omitted. On the other hand, in a case in which the current situation of the own vehicle satisfies the conditions for turning the AHS unit 32 on, the judgment in step 202 is affirmative, and the routine proceeds to step 204.

In step 204, the headlamp control ECU 16 reads-out the information regarding the objects of monitoring that exists in front of the own vehicle, which has been received from the peripheral situation monitoring ECU 40 and has been stored in the memory 20 or the like. In next step 206, on the basis of the information regarding the objects of monitoring read-out in step 204, the headlamp control ECU 16 judges whether or not another vehicle whose lamps are on exists in front of the own vehicle. In a case in which the judgment of step 206 is negative, the routine proceeds to step 228, and, in step 228, the headlamp control ECU 16 turns the upper-level light distribution LED group 34 on.

In a case in which another vehicle whose lamps are on exists in front of the own vehicle, the judgment of step 206 is affirmative, and the routine proceeds to step 208. In step 208, on the basis of the position information (the pitch angles of the specific positions) that express the specific positions of the individual other vehicles whose lamps are on and that is included in the information of the objects of monitoring read-out in step 204, the headlamp control ECU 16 computes estimated glass upper end angles, which are the angle difference between a horizontal line and the upper end position (refer also to broken line 108 illustrated in FIG. 9)

of the window glass of another vehicle, for all of the other vehicles whose lamps are on and that exist in front of the own vehicle.

The computing of the estimated glass upper end angles of the other vehicles may be realized by regarding a preset position that is predetermined height higher than the specific position of another vehicle expressed by the position information, to be the glass upper end position of the other vehicle, and computing the pitch angle that corresponds to that glass upper end position. The predetermined height may be different in accordance with whether the other vehicle is an oncoming vehicle or a preceding vehicle. For example, in a case in which the other vehicle is an oncoming vehicle and the specific position of the other vehicle is the upper end position of the lamp region of the other vehicle (in this case, the region of the headlamps), height H1 illustrated in FIG. 10A may be used as the predetermined height. Further, in a case in which the other vehicle is a preceding vehicle and the specific position of the other vehicle is the upper end position of the lamp region of the other vehicle (in this case, the region of the tail lamps), for example, height H3 that is illustrated in FIG. 10B may be used as the predetermined height.

Figure 10A:
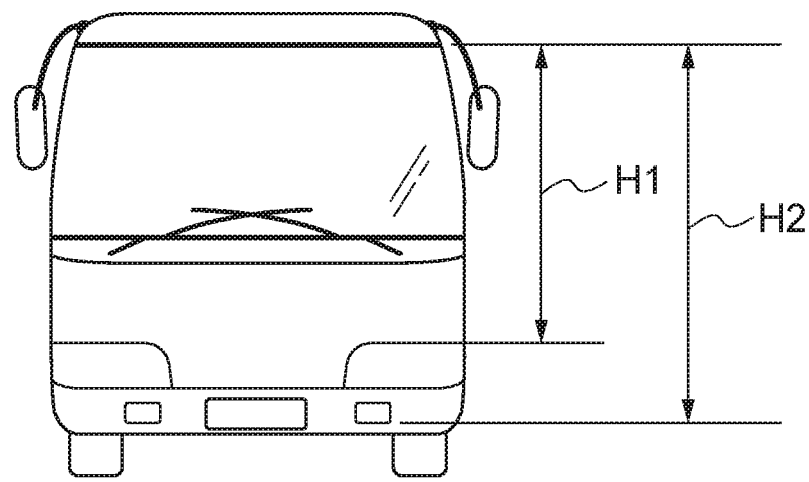
FIG. 10A is a schematic drawing explaining computation of an estimated glass upper end angle in a case in which another vehicle is an oncoming vehicle.
Figure 10B:
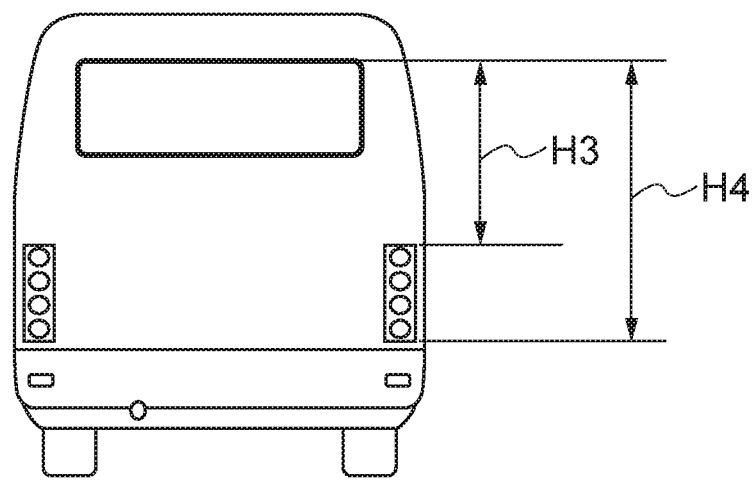
FIG. 10B is a schematic drawing explaining computation of the estimated glass upper end angle in a case in which another vehicle is a preceding vehicle.

In a case in which the other vehicle is an oncoming vehicle and the specific position of the other vehicle is the lower end position of the lamp region (the region of the headlamps) of the other vehicle, for example, height H2 illustrated in FIG. 10A may be used as the predetermined height. In a case in which the other vehicle is a preceding vehicle and the specific position of the other vehicle is the lower end position of the lamp region (the region of the tail lamps) of the other vehicle, for example, height H4 illustrated in FIG. 10B may be used as the predetermined height.

Further, the distance between the lamp region and the glass upper end position differs in accordance with the type of the other vehicle, and specifically, in accordance wither whether the other vehicle is a large vehicle such as a bus or a truck or the like, or is a small vehicle such as a passenger vehicle of the like. Therefore, the predetermined heights may be respectively specified for large vehicles and small vehicles, and whether each individual other vehicle is a large vehicle or a small vehicle may be discriminated from the captured image, and the value of the predetermined height that is used in the computing of the estimated glass upper end angle may be switched in accordance with the results of discrimination.

In next step 210, the headlamp control ECU 16 extracts the maximum value among the estimated glass upper end angles computed in step 208 for all of the other vehicles whose lamps are on and that exist in front of the own vehicle, and stores the extracted maximum value in the memory 20 or the like as a target angle of the lower edge of the illumination range of the upper-level light distribution LED group 34. This target angle of the lower edge is an example of the "target position of the lower edge of the illumination range of the upper illumination light source" in the present disclosure.

Here, in a case in which the upper-level light distribution LED group 34 is turned on by simply using the target angle obtained in step 210 as the target angle of the lower edge of the illumination range of the upper-level light distribution LED group 34, there is the concern that the light from the upper-level light distribution LED group 34 will impart glare to other vehicles.

Namely, as described above, time of a certain extent is required in order to detect the vanishing point, and, in a case in which the loaded state of the vehicle differs from the standard loaded state, during the time period from the ignition switch of the own vehicle being turned on until the detection of the vanishing point ends, an error corresponding to the change in the imaging optical axis of the camera 52 (refer also to the angle difference a illustrated in FIG. 8B), is added to the pitch angle of the specific position of another vehicle that is included in the information received from the peripheral situation monitoring ECU 40. Therefore, during the time period until detection of the vanishing point ends, there is the possibility that the light from the upper-level light distribution LED group 34 will impart glare to another vehicle due to the error added to the pitch angle of the specific position of the other vehicle.

Further, in the present embodiment, on the basis of the predetermined relationship between the sinking amount of the rear suspension of the own vehicle and the upper limit value of the inclination of the own vehicle in the pitch direction, the leveling control ECU 56 controls the optical axis of the headlamp by determining that the own vehicle is tilting as much as the upper limit value that corresponds to the sinking amount of the rear suspension of the own vehicle that has been sensed by the stroke sensor 58. Therefore, in a case in which the actual inclination of the own vehicle in the pitch direction is smaller than the upper limit value that corresponds to the sensed sinking amount, the optical axis of the headlamp is controlled so as to be directed downward more than in a case in which the inclination of the own vehicle in the pitch direction is the upper limit value.

Figure 11:
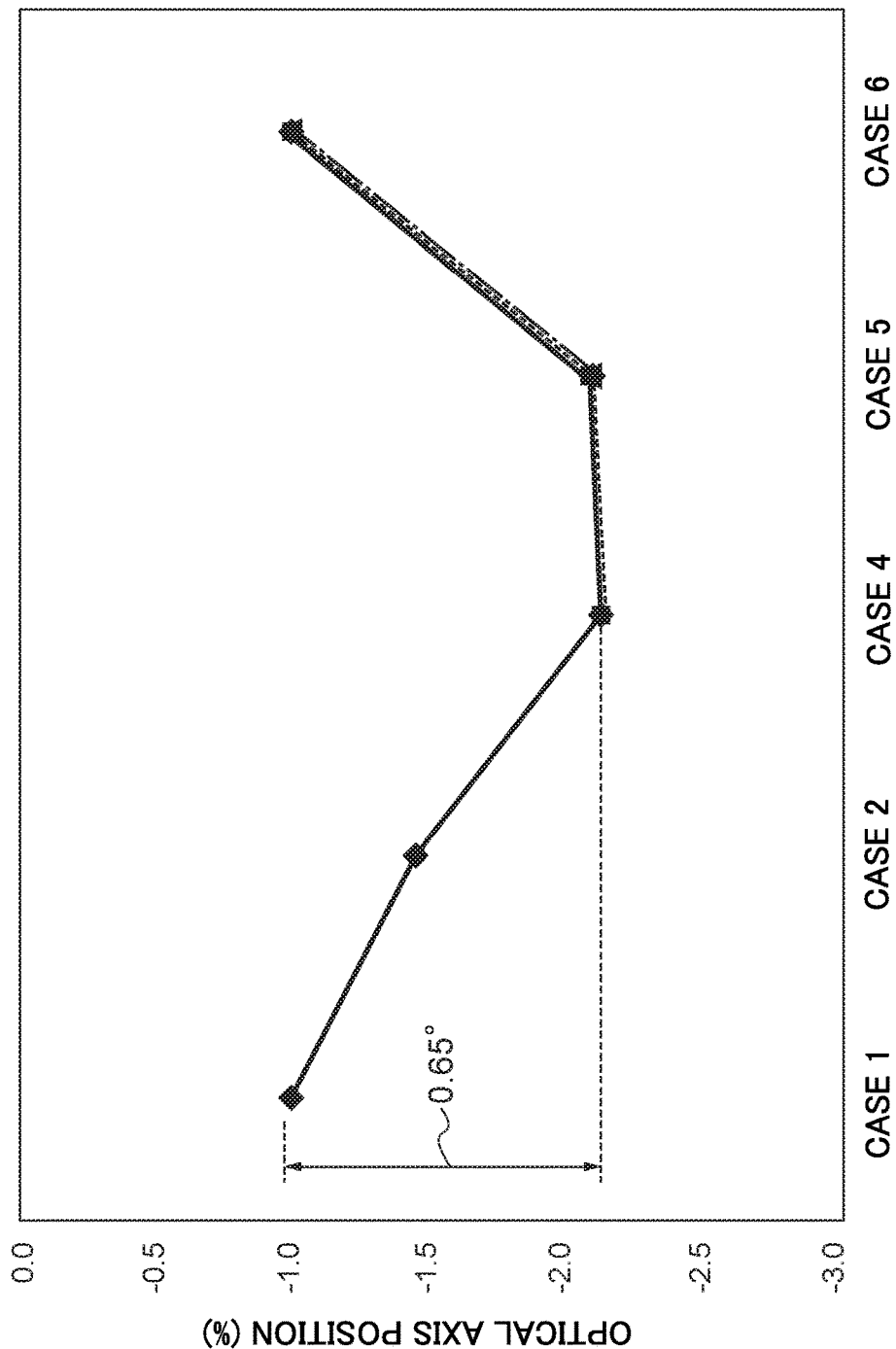
FIG. 11 is a graph illustrating examples of the change in the optical axis of a headlamp in respective cases in which the loaded states differ from one another.

In this way, the difference between the upper limit value of the inclination of the own vehicle in the pitch direction and the actual inclination is the control error of the leveling control by the leveling control ECU 56. FIG. 11 illustrates an example of the position (the inclination) of the optical axis of the headlamp that has been subjected to leveling control, at times when the vehicle is in predetermined loaded states that are respectively different from one another (cases 1 through 6). In the example illustrated in FIG. 11, the optical axis of the headlamp that has been subjected to leveling control changes a maximum of 0.65° in accordance with the loaded state of the vehicle. There is the possibility that the light from the upper-level light distribution LED group 34 will impart glare to another vehicle due to the control error of this leveling control as well.

Figure 12:
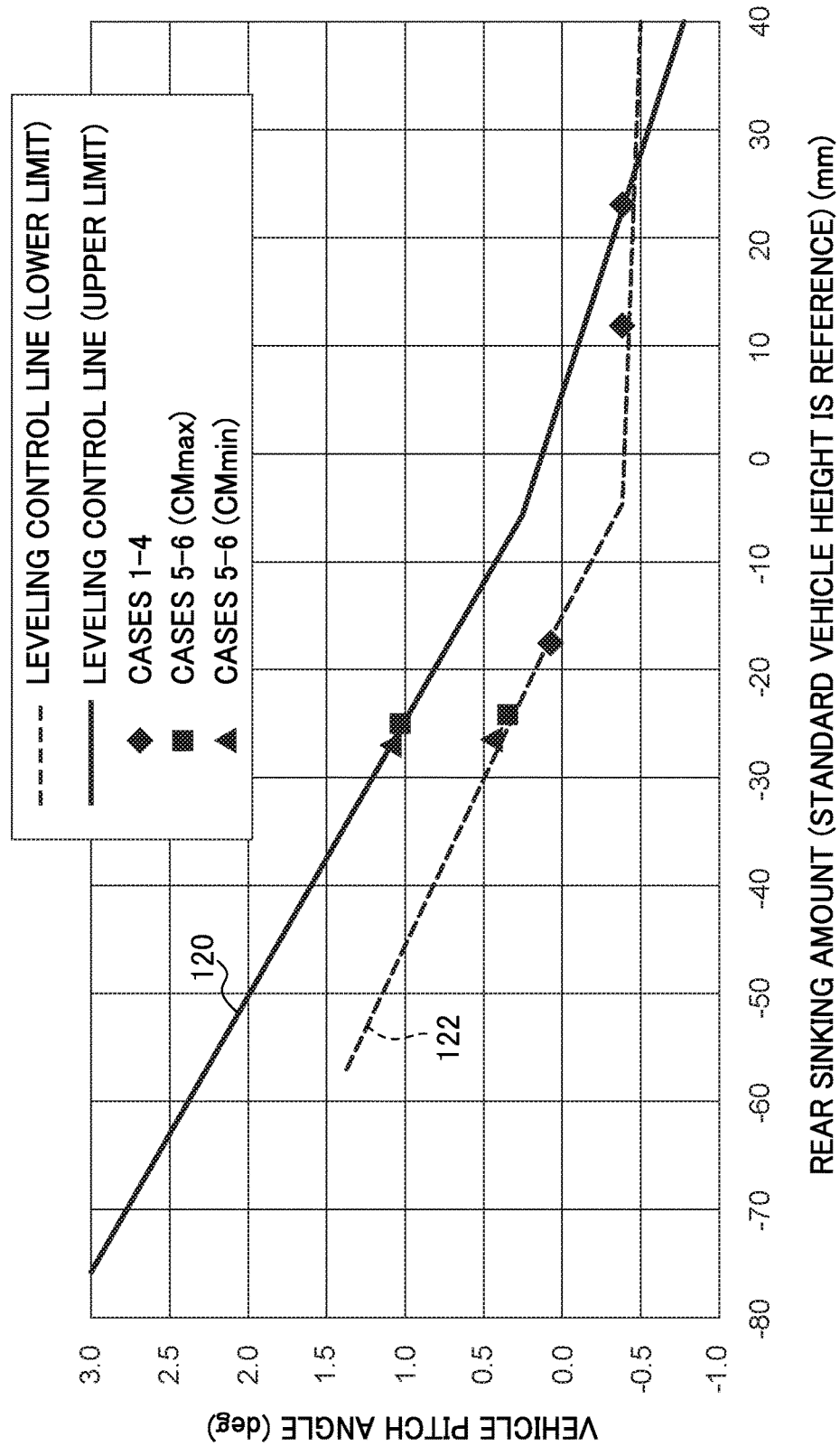
FIG. 12 is a graph illustrating an example of a sinking amount-leveling control line map.

Therefore, in the present embodiment, a sinking amount-leveling control line map 26, such as that illustrated in FIG. 12 as an example, is determined in advance, and the determined sinking amount-leveling control line map 26 is stored in advance in the storage section 22. In the sinking amount-leveling control line map 26, the relationship between the sinking amount of the rear suspension of the vehicle that has been sensed by the stroke sensor 58 and the inclination of the vehicle in the pitch direction, which relationship is prescribed respectively by an upper limit leveling control line 120 and a lower limit leveling control line 122 that are illustrated in FIG. 12, is registered as a map.

The upper limit leveling control line 120 expresses the relationship between the sinking amount of the rear suspension of the vehicle and the upper limit value (the maximum value) of the inclination of the vehicle in the pitch direction. The upper limit leveling control line 120 is equivalent to a control line that is used in order to judge the upper limit value of the inclination of the vehicle in the pitch direction from the sinking amount of the rear suspension of the vehicle when the leveling control ECU 56 carries out leveling control (control of the optical axis of the headlamp). In the present embodiment, the control line that the leveling control ECU 56 uses is appropriated for use as the upper limit leveling control line 120.

By using the upper limit leveling control line 120, the upper limit value of the inclination of the own vehicle in the pitch direction may be determined from the sinking amount of the rear suspension of the own vehicle that has been sensed by the stroke sensor 58. Further, the determined upper limit value of the inclination of the own vehicle in the pitch direction corresponds to the maximum value of the error that is added to the pitch angle of the specific position of another vehicle due to the change in the imaging optical axis of the camera 52 during the time period until detection of the vanishing point ends (refer also to the angle difference a illustrated in FIG. 8B). Therefore, the determined upper limit value may be used in correction of the error that is caused by the change in the imaging optical axis of the camera 52 during the aforementioned time period.

The lower limit leveling control line 122 expresses the relationship between the sinking amount of the rear suspension of the vehicle and the lower limit value (the minimum value) of the inclination of the vehicle in the pitch direction. As illustrated in FIG. 13 for example, the lower limit leveling control line 122 may be determined from a scatter diagram that illustrates the relationship between the sinking amount of the rear suspension of the vehicle (in detail, the horizontal axis of FIG. 13 is the change in the vehicle height value of the vehicle rear portion when the vehicle height value in the standard loaded state is a reference (=0 mm)), and the optical axis error amount [%] due to the leveling control, at times when the vehicle is in various loaded states.

Specifically, in the scatter diagram illustrated in FIG. 13 for example, the lower limit values of optical axis error amounts at times when the vehicle height of the vehicle rear portion is respective values, are extracted, and the relationship between the sinking amount of the vehicle rear portion and the lower limit value of the optical axis error amount is determined so as to include the extracted lower limit values. As an example, in FIG. 13, lower limit values a1, a2, a3, a4, a5 of the optical axis error amounts at times when the vehicle height of the vehicle rear portion is the respective values of 0, b2, b3, b4, b5 are extracted, and, by connecting the respective points by straight lines, the relationship between the sinking amount of the vehicle rear portion and the lower limit value of the optical axis error amount is obtained. The lower limit leveling control line 122 that is illustrated in FIG. 12 may be obtained by converting the determined relationship between the sinking amount of the vehicle rear portion and the lower limit value of the optical axis error amount into a relationship between the sinking amount of the rear suspension of the vehicle and the inclination of the vehicle in the pitch direction.

In the present embodiment, the leveling control ECU 56 carries out leveling control (control of the optical axis of the headlamp) by determining that the own vehicle is tilting in the pitch direction as much as the upper limit value of the inclination of the own vehicle that corresponds to the sinking amount of the rear suspension of the own vehicle that has been sensed by the stroke sensor 58. Accordingly, there is a control error in the leveling control by the leveling control ECU 56, and, in a case in which the actual inclination of the own vehicle in the pitch direction is smaller than the upper limit value, the optical axis of the headlamp is directed further downward than in a case in which the actual inclination of the own vehicle in the pitch direction is the upper limit value.

In contrast, the difference between the upper limit leveling control line 120 and the lower limit leveling control line 122, at times when the sinking amount of the rear suspension of the own vehicle is respective values, corresponds to the maximum value of the control error of the leveling control by the leveling control ECU 56. Accordingly, the difference between the upper limit leveling control line 120 and the lower limit leveling control line 122, that corresponds to the sinking amount of the rear suspension of the own vehicle sensed by the stroke sensor 58, may be used in correcting (the error of the change in the optical axis of the headlamp that is due to) the control error of the leveling control.

Control for turning on/off the upper-level light distribution LED group 34 by using the above-described sinking amount-leveling control line map 26 is described hereinafter. In step 212, the headlamp control ECU 16 acquires, from the leveling control ECU 56, the sinking amount of the rear suspension of the own vehicle that has been detected by the stroke sensor 58. In next step 214, the headlamp control ECU 16 references the value of the vanishing point detection flag, and judges whether or not the vanishing point detection flag is 1.

In a case in which the vanishing point detection flag is 0, the detection of the vanishing point has not ended, and therefore, there is the need to correct respectively the error that is caused by the change in the imaging optical axis of the camera 52 and the error of the leveling control. Therefore, in a case in which the judgment of step 214 is negative, the routine proceeds to step 216.

In step 216, the headlamp control ECU 16 determines the angle (the amount of change) of the own vehicle in the pitch direction that corresponds to the rear suspension of the own vehicle acquired in step 212, as the maximum error that is due to the change in the imaging optical axis of the camera 52, based on the relationship between the sinking amount of the rear suspension of the vehicle, that is expressed by the upper limit leveling control line 120 registered in the sinking amount-leveling control line map 26, and the upper limit value (the maximum value) of the inclination of the vehicle in the pitch direction.

In next step 218, on the basis of the upper limit leveling control line 120 and the lower limit leveling control line 122 registered in the sinking amount-leveling control line map 26, the headlamp control ECU 16 determines, as the maximum error of the leveling control, the difference (=the amount of change in the angle of the own vehicle in the pitch direction) between the upper limit leveling control line 120 and the lower limit leveling control line 122 that corresponds to the rear suspension of the own vehicle acquired in step 212.

In step 220, the headlamp control ECU 16 reads-out the target angle (the estimated glass upper end angle) of the lower edge of the illumination range of the upper-level light distribution LED group 34 stored in the memory 20 or the like in prior step 210. Then, by adding the maximum error caused by the change in the imaging optical axis and determined in step 216, and the maximum error of the leveling control determined in step 218, to the read-out target angle, the headlamp control ECU 16 computes the lower limit angle of the lower edge of the illumination range of the upper-level light distribution LED group 34 (refer to the following formula as well).

illumination range lower limit angle←target angle (estimated glass upper end angle)+imaging optical axis error+leveling control error On the other hand, in a case in which the vanishing point detection flag is 1, detection of the vanishing point has ended. Therefore, in the pitch angle of the specific position of another vehicle, the error that corresponds to the change in the imaging optical axis has been calibrated by the peripheral situation monitoring ECU 40, and correction of the error that is due to the change in the imaging optical axis of the camera 52 is unnecessary. However, because the control error of the leveling control remains, the control error of the leveling control must be corrected. Therefore, in a case in which the judgment of step 214 is affirmative, the routine proceeds to step 222.

In step 222, in the same way as in step 218, the headlamp control ECU 16 determines, as the maximum error of the leveling control, the difference (=the amount of change in the angle of the own vehicle in the pitch direction) between the upper limit leveling control line 120 and the lower limit leveling control line 122 that corresponds to the rear suspension of the own vehicle acquired in step 212.

In next step 224, the headlamp control ECU 16 reads-out the target angle (the estimated glass upper end angle) of the lower edge of the illumination range of the upper-level light distribution LED group 34 stored in the memory 20 or the like in prior step 210. Then, by adding the maximum error of the leveling control determined in step 222 to the read-out target angle, the headlamp control ECU 16 computes the lower limit angle of the lower edge of the illumination range of the upper-level light distribution LED group 34 (refer to the following formula as well).

illumination range lower limit angle←target angle (estimated glass upper end angle)+leveling control error In step 226, the headlamp control ECU 16 judges whether or not the angle of the lower edge of the illumination range of the upper-level light distribution LED group 34 is greater than or equal to the lower limit angle of the lower edge of the illumination range of the upper-level light distribution LED group 34 computed in step 220 or step 224.

In a case in which the judgment of step 226 is affirmative, a judgment is possible such that, even if the error caused by the change in the imaging optical axis and the control error of the leveling control are considered, the illumination range of the upper-level light distribution LED group 34 does overlap the individual other vehicles that exist in front of the own vehicle, and that there is no fear that that glare will be imparted to the respective other vehicles. Therefore, in a case in which the judgment in step 226 is affirmative, the routine proceeds to step 228, and, in step 228, the headlamp control ECU 16 turns on the upper-level light distribution LED group 34. As a result, the range (refer also to the range 100 illustrated in FIG. 9) further upward than the other vehicles that exist in front of the own vehicle is illuminated by the light from the upper-level light distribution LED group 34, and the ability of the passenger to see far-off improves.

On the other hand, in a case in which the judgment in step 226 is negative, there is the possibility that the illumination range of the upper-level light distribution LED group 34 will overlap any of the other vehicles that exist in front of the own vehicle. Therefore, in a case in which the judgment in step 226 is negative, the routine proceeds to step 230, and, in step 230, the headlamp control ECU 16 turns the upper-level light distribution LED group 34 off. In this case, glare being imparted to any of the other vehicles that exist in front of the own vehicle due to turning-on of the upper-level light distribution LED group 34 is prevented.

When step 228 or step 230 is carried out, the routine proceeds to step 232, and, in step 232, the headlamp control ECU 16 controls the turning on/off of and the light distribution of the lower-level light distribution LED group 36. In this control as well, in consideration of errors due to various types of factors (e.g., an error caused by a control delay, an error caused by individual differences in vehicles, and the like), it is preferable to set target illumination ranges so as to be apart from the left and right ends of another vehicle that exists in front of the own vehicle as illustrated as ranges 102 in FIG. 9 as an example, and to carry out control of the lower-level light distribution LED group 36 on the basis of the target illumination ranges that are set. After the processing of step 232 is carried out, the routine proceeds to step 234.

In this way, in the present embodiment, the peripheral situation monitoring ECU 40 detects the vanishing point position from the captured image of the front region of the vehicle that is captured by the camera 52. During the time period until the vanishing point position is detected by the peripheral situation monitoring ECU 40, the headlamp control ECU 16 controls the light distribution of the headlamp in accordance with the sinking amount of the rear suspension of the own vehicle sensed by the stroke sensor 58. After the vanishing point position is detected by the peripheral situation monitoring ECU 40, the headlamp control ECU 16 controls the light distribution of the headlamp on the basis of pitch angles that express the specific positions of other vehicles and that have been calibrated by using the detected vanishing point position as a reference. As a result, the imparting of glare to other vehicles may be controlled, including during the time period up until the vanishing point position is detected.

Further, in the present embodiment, the headlamp control ECU 16 controls the turning on/off of the upper-level light distribution LED group 34 such that the illumination range of the upper-level light distribution LED group 34, which is for illuminating the region further upward than other vehicles that exist in front of the own vehicle, does not overlap the other vehicles. As a result, the region further upward than other vehicles that exist in front of the own vehicle may be illuminated while the imparting of glare to the other vehicles is suppressed, even if the posture of the own vehicle is downward toward the front more than supposed.

Further, in the present embodiment, during the time period until the vanishing point position is detected, the headlamp control ECU 16 determines the maximum error caused by the change in the imaging optical axis of the camera 52 based on the sinking amount of the rear suspension of the own vehicle sensed by the stroke sensor 58. The headlamp control ECU 16 controls the upper-level light distribution LED group 34 on the basis of the target angle (estimated glass upper end angle) of the lower edge of the illumination range of the upper-level light distribution LED group 34 that is determined on the basis of the uncalibrated pitch angles that express specific positions of other vehicles, and the determined maximum error caused by the change in the imaging optical axis. As a result, the number of steps in developing the vehicle headlamp light distribution control device 14 may be reduced.

Moreover, in the present embodiment, on the basis of the relationship (the upper limit leveling control line 120) between the sinking amount of the rear suspension of the own vehicle and the upper limit value of the inclination of the vehicle in the pitch direction, the leveling control ECU 56 controls the optical axis of the headlamp by determining that the vehicle is tilting as much as the upper limit value of the inclination of the vehicle in the pitch direction that corresponds to the sensed sinking amount of the rear suspension of the own vehicle. Further, the headlamp control ECU 16 uses the upper limit value of the inclination of the vehicle in the pitch direction, which corresponds to the sensed sinking amount, as the maximum error caused by the change in the imaging optical axis. As a result, the potential of imparting glare to other vehicles that is due to a change in the imaging optical axis may be reduced by simple processing.

Further, in the present embodiment, on the basis of the predetermined relationship between the sinking amount of the rear suspension of the vehicle and the range of the inclination of the vehicle (i.e., the upper limit leveling control line 120 and the lower limit leveling control line 122), the headlamp control ECU 16 determines, as the maximum error of the leveling control, the magnitude of the range of the inclination of the vehicle that corresponds to the sinking amount of the rear suspension of the vehicle sensed by the stroke sensor 58, that is, the difference between the upper limit leveling control line 120 and the lower limit leveling control line 122. The headlamp control ECU 16 controls the upper-level light distribution LED group 34 by using the target angle (the estimated glass upper end angle) of the lower edge of the illumination range of the upper-level light distribution LED group 34 that is determined on the basis of the uncalibrated pitch angles that express the specific positions of other vehicles, and the determined maximum error of the leveling control. As a result, the potential of imparting glare to other vehicles due to control error of the leveling control by the leveling control ECU 56 may also be reduced.

Further, the present embodiment is not configured such that the illumination range of the headlamp is recognized based on the captured image and the illumination range is controlled, as in the technique of JP-A No. 2013-203130. Therefore, even in a situation in which the illumination range of the headlamp cannot be recognized from the captured image, for a reason such as the intensity change at the outer edge position of the illumination range of the headlamp is indistinct, the light distribution of the headlamp may be controlled appropriately, and the potential of imparting glare to other vehicles may be reduced.

Note that the above describes an aspect in which the leveling control ECU 56 carries out the leveling control that controls the optical axis of the headlamp, while determining that the vehicle is tilting as much as the upper limit value of the inclination of the vehicle that corresponds to the sinking amount of the rear suspension of the vehicle sensed by the stroke sensor 58. However, the present disclosure is not limited to application to a vehicle in which a leveling control mechanism that carries out the above-described leveling control is installed, and, for example, may also be applied to a vehicle in which is installed a vehicle height control mechanism (e.g., an electronic control suspension) that is able to change the vehicle height of the front and the rear of a vehicle on the basis of the vehicle heights of the front portion and the rear portion of the vehicle that are sensed by sensors.

In this case, because the inclination in the pitch direction is controlled to be approximately constant by the vehicle height control mechanism at the vehicle, there is no need to consider the control error of the leveling control. Therefore, for example, during the time period until detection of the vanishing point ends, the lower limit angle of the lower edge of the illumination range of the upper-level light distribution LED group 34 may be made to be an angle in which the maximum error caused by the change in the imaging optical axis of the camera 52 is added to the target angle (the estimated glass upper end angle) of the lower edge of the illumination range of the upper-level light distribution LED group 34, or is made to be an angle in which a predetermined angle that takes into account an error other than the control error of the leveling control is further added to this angle. Further, after detection of the vanishing point ends, the lower limit angle of the lower edge of the illumination range of the upper-level light distribution LED group 34 may be made to be the target angle (the estimated glass upper end angle) of the lower edge of the illumination range of the upper-level light distribution LED group 34, or may be made to be an angle in which the predetermined angle is further added to this angle.

Further, although the above describes an aspect in which all of the LED chips that are included in the upper-level light distribution LED group 34 are turned on/off integrally, the present disclosure is not limited to this. The light distribution (illumination range) of the upper-level light distribution LED group 34 may be controlled by controlling the turning on/off in units of the individual LED chips that are included in the upper-level light distribution LED group 34. Alternatively, the AHS unit 32 may be divided into a unit of the upper-level light distribution LED group 34 and a unit of the lower-level light distribution LED group 36, and the light distribution (illumination range) of the upper-level light distribution LED group 34 may be controlled by changing the inclination of the entire unit of the upper-level light distribution LED group 34 or the inclination of the reflector that is incorporated within the unit of the upper-level light distribution LED group 34.

Further, the above describes an aspect in which the vehicle height of the rear portion of the vehicle is sensed by the stroke sensor 58 sensing the sinking amount of the rear suspension of the vehicle as an example of a physical amount that relates to the inclination of the vehicle. However, the present disclosure is not limited to this. For example, the vehicle heights of the front portion and the rear portion of the vehicle may be respectively sensed by sensing, as the above-described physical amounts, the sinking amounts of the front and rear suspensions of the vehicle, or the respective distances between the lower end of the body and the road surface in vicinities of a front wheel and a rear wheel of the vehicle. Alternatively, the inclination of the vehicle may be sensed directly by utilizing the output of a gyro sensor or the like. The inclination of the vehicle may be sensed accurately in these aspects.

Moreover, although "inclination of the vehicle" described in the present specification includes at least inclination of the vehicle in the pitch direction, inclination of the vehicle in the roll direction may also be included. Namely, the above describes an aspect in which the same control is carried out for the upper-level light distribution LED groups 34 of the left and right headlamp units 28L, 28R in accordance with the sinking amount of the rear suspension of the vehicle that is a physical amount relating to the inclination of the vehicle in the pitch direction. However, the present disclosure is not limited to this, and inclination in the roll direction (or a physical amount relating to this inclination) also may be sensed in addition to the inclination of the vehicle in the pitch direction. The upper-level light distribution LED groups 34 at the left and the right may be controlled independently in accordance with the sensed inclination of the vehicle in the roll direction such that the illumination ranges of the upper-level light distribution LED groups 34 of the left and right headlamp units 28L, 28R do not overlap respective other vehicles.

Further, the above describes an aspect in which, as a result of the judgment of step 214 of FIG. 7 being affirmative after detection of the vanishing point is completed and the vanishing point detection flag is set to 1, the processing (processing including steps 222, 224 of FIG. 7) of controlling the light distribution of the headlamp on the basis of information obtained by calibrating the information obtained from the image in accordance with the detected vanishing point position, is started immediately. However, the present disclosure is not limited to this, and the scope of the disclosure also includes an aspect in which the processing of controlling the light distribution of the headlamp on the basis of information obtained by calibrating the information obtained from the image in accordance with the detected vanishing point position, is started after a predetermined time elapses from detection of the vanishing point being completed and the vanishing point detection flag being set to 1.

What is claimed is:

1. A vehicle headlamp light distribution control device comprising:
    a detector that is configured to detect a reference position from an image of a front region of a vehicle; and
    an electronic control unit that is configured to control, during a time period until the reference position is detected by the detector, a light distribution of a headlamp of the vehicle in accordance with a sensed inclination of the vehicle or a physical amount expressing the inclination of the vehicle, and to control, after the reference position is detected by the detector, the light distribution of the headlamp on the basis of calibrated information obtained by calibrating information obtained from the image in accordance with the detected reference position.

2. The vehicle headlamp light distribution control device of claim 1, wherein
    the headlamp includes an upper illumination light source that is configured, in a case in which other vehicle exists in front of the vehicle, to illuminate a region further upward than the other vehicle, and
    the electronic control unit is configured to control at least one of turning on/off of the upper illumination light source or changing of an illumination range of the upper illumination light source, such that the illumination range of the upper illumination light source does not overlap the other vehicle.

3. The vehicle headlamp light distribution control device of claim 2, wherein
    the vehicle is configured to sense a vehicle height of a rear portion of the vehicle as the physical amount relating to the inclination of the vehicle, and, on the basis of a relationship between the vehicle height of the rear portion of the vehicle and an upper limit value of the inclination of the vehicle or a value within a predetermined range from the upper limit value, to control an optical axis of the headlamp by determining that the vehicle is tilting as much as the upper limit value that corresponds to the sensed vehicle height or a value within the predetermined range from the upper limit value, and
    the electronic control unit is configured, during the time period until the reference position is detected, to determine an upper limit value of the inclination of the vehicle that corresponds to the sensed vehicle height, or a value within the predetermined range from the upper limit value, and to control the upper illumination light source by using a target position of a lower edge of an illumination range of the upper illumination light source that is determined on the basis of uncalibrated information obtained from the image, the target position being a position for setting the illumination range to not overlap the other vehicle, and the determined upper limit value of the inclination of the vehicle or the determined value within a predetermined range from the upper limit value.

4. The vehicle headlamp light distribution control device of claim 2, wherein
    the vehicle is configured to sense a vehicle height of a rear portion of the vehicle as the physical amount relating to the inclination of the vehicle, and, on the basis of a relationship between the vehicle height of the rear portion of the vehicle and an upper limit value of the inclination of the vehicle or a value within a predetermined range from the upper limit value, to control an optical axis of the headlamp by determining that the vehicle is tilting as much as the upper limit value that corresponds to the sensed vehicle height or a value within the predetermined range from the upper limit value, and
    the electronic control unit is configured, on the basis of a relationship between the vehicle height and a magnitude of a range of inclination of the vehicle, to determine a magnitude of the range of inclination of the vehicle that corresponds to the sensed vehicle height, and to control the upper illumination light source by using the determined magnitude of the range of inclination of the vehicle, and a target position of a lower edge of an illumination range of the upper illumination light source that is determined on the basis of uncalibrated information obtained from the image, the target position being a position for setting the illumination range to not overlap the other vehicle.

5. A vehicle headlamp light distribution control method comprising:
    detecting a reference position from a captured image of a region in front of a vehicle;
    during a time period until the reference position is detected, controlling, by an electronic control unit, a light distribution of a headlamp of the vehicle in accordance with a sensed inclination of the vehicle or a physical amount expressing the inclination of the vehicle; and
    after the reference position is detected, controlling, by the electronic control unit, the light distribution of the headlamp on the basis of calibrated information obtained by calibrating information obtained from the captured image, in accordance with the detected reference position.

6. A non-transitory storage medium that stores a program causing an electronic control unit to execute a vehicle headlamp light distribution control processing, the vehicle headlamp light distribution control processing comprising:
    detecting a reference position from a captured image of a region in front of a vehicle;
    during a time period until the reference position is detected, controlling, by the electronic control unit, a light distribution of a headlamp of the vehicle in accordance with a sensed inclination of the vehicle or a physical amount expressing the inclination of the vehicle; and
    after the reference position is detected, controlling, by the electronic control unit, the light distribution of the headlamp on the basis of calibrated information obtained by calibrating information obtained from the captured image, in accordance with the detected reference position.

\* \* \* \* \*

UNITED STATES PATENT AND TRADEMARK OFFICE
CERTIFICATE OF CORRECTION

PATENT NO. : 9,944,222 B2
APPLICATION NO. : 15/426684
DATED : April 17, 2018
INVENTOR(S) : Katsutoshi Tsuzuki It is certified that error appears in the above-identified patent and that said Letters Patent is hereby corrected as shown below:

In Column 11, Line 22, delete "angle difference a" and insert --angle difference $\alpha$--, therefor.

In Column 11, Line 26, delete "angle difference a" and insert --angle difference $\alpha$--, therefor.

In Column 16, Line 5, delete "angle difference a" and insert --angle difference $\alpha$--, therefor.

In Column 17, Line 13 & 14, delete "angle difference a" and insert --angle difference $\alpha$--, therefor.

Signed and Sealed this
Twenty-ninth Day of May, 2018

Andrei Iancu
*Director of the United States Patent and Trademark Office*